United States Patent [19]

Sorimachi et al.

[11] Patent Number: 5,166,810
[45] Date of Patent: Nov. 24, 1992

[54] IMAGE QUALITY CONTROL SYSTEM FOR AN IMAGE PROCESSING SYSTEM

[75] Inventors: Yoshiyuki Sorimachi, Kanagawa; Yuzuru Suzuki, Tokyo, both of Japan

[73] Assignee: Fuji Xerox Co., Ltd., Tokyo, Japan

[21] Appl. No.: 575,017

[22] Filed: Aug. 30, 1990

[30] Foreign Application Priority Data

Aug. 30, 1989 [JP] Japan .................. 1-225902

[51] Int. Cl.$^5$ .................. H04N 1/40
[52] U.S. Cl. .................. 358/462; 358/451; 358/455; 358/463
[58] Field of Search .............. 358/451, 455, 456, 458, 358/459, 462, 463

[56] References Cited

U.S. PATENT DOCUMENTS

| | | | |
|---|---|---|---|
| 4,499,493 | 2/1985 | Nishimura | 358/463 |
| 4,672,463 | 6/1987 | Tomohisa et al. | 358/451 |
| 4,730,219 | 3/1988 | Oshikoshi et al. | 358/451 |
| 4,782,399 | 11/1988 | Sato | 358/456 |
| 4,833,531 | 5/1989 | Abe et al. | 358/451 |
| 4,860,118 | 8/1989 | Arimoto | 358/451 |
| 4,920,571 | 4/1990 | Abe et al. | 358/451 |
| 4,942,461 | 7/1990 | Abe et al. | 358/455 |
| 5,032,903 | 7/1991 | Suzuki et al. | 358/75 |
| 5,034,990 | 7/1991 | Klees | 358/462 |

*Primary Examiner*—Edward L. Coles, Sr.
*Assistant Examiner*—Thomas L. Stoll
*Attorney, Agent, or Firm*—Finnegan, Henderson, Farabow, Garrett and Dunner

[57] ABSTRACT

An image quality control system for an image processing system for producing an image of high quality by removing noise and mesh-dot components from image input signals representing a scanned original image, the image quality control system comprises a low-pass smoothing filter adapted for removing from image input signals representing a halftone image substantially all of any mesh-dot component, for smoothing the image input signals representing the halftone image, and for producing smoothed output signals representing the smoothed image input signals, a smoothing modulation table for modulating the smoothed output signals of the smoothing filter to produce modulated smoothed output signals, a bandpass edge detect filter for detecting edge component signals of the image input signals, the edge component signals comprising a high frequency component of the image input signals, the edge detect filter producing edge output signals, an edge emphasis modulation table for modulating the edge output signals to produce modulated edge output signals, and means for selecting parameters of the bandpass edge detect filter, the low-pass smoothing filter, the smoothing modulation table, and the edge emphasis modulation table for every image signal such that the modulated edge output signals and the modulated smoothed output signals correspond to the image input signals with the noise and mesh-dot components thereof substantially removed.

23 Claims, 23 Drawing Sheets

1/2 TO 1/3 IN THE PLUS SIDE

COEXIST MODE

CHARACTER MODE

PHOTOGRAPH MODE

PRINT MODE

| LUT-1 | A | B | C | D | C | B | A |
| LUT-2 | E | F | G | H | G | F | E |
| LUT-3 | I | J | K | L | K | J | I |
| LUT-4 | M | N | O | P | O | N | M |
|       | I | J | K | L | K | J | I |
|       | E | F | G | H | G | F | E |
|       | A | B | C | D | C | B | A |

| VAL-H | | | | VAL-L | | | | |
|---|---|---|---|---|---|---|---|---|
| XD | XC | XB | XA | XA | XB | XC | XD | |
| H L | H L | H L | H L | L H | L H | L H | L H | * |

|     | 15 | 8 | 7 | 0 |
|-----|----|----|----|----|
| n   | b  |    | a  |    |
| n+2 | d  |    | c  |    |

↑ SIGN    ↑ SIGN

FIG. 13(e)
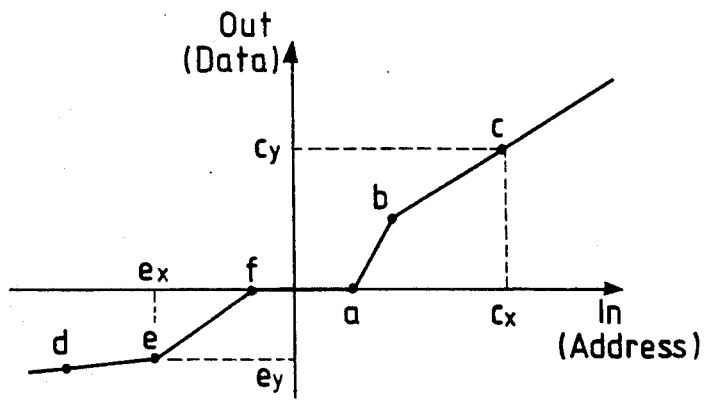
FIG. 13(f)
| | | |
|---|---|---|
| n | $a(y) \equiv 0$ | $a(x)$ |
| n+2 | $b(y)$ | $b(x)$ |
| n+4 | $c(y)$ | $c(x)$ |
| n+6 | $d(y)$ | $d(x)$ |
| n+8 | $e(y)$ | $e(x)$ |
| n+10 | $f(y) \equiv 0$ | $f(x)$ |
| | ↑ SIGN | ↑ SIGN |
FIG. 14
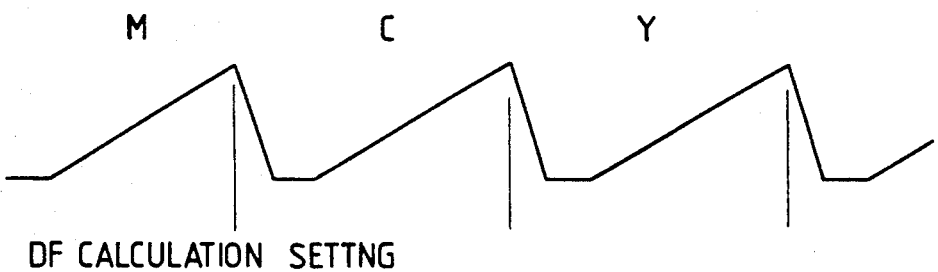
DF CALCULATION SETTNG

FIG. 16(n')
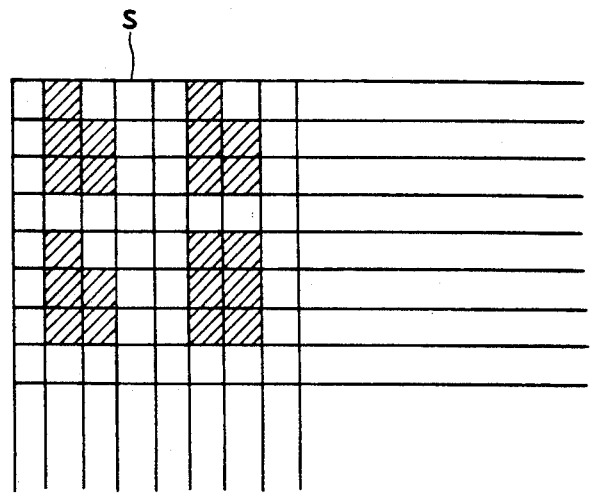
FIG. 16(n")
FIG. 16(o')
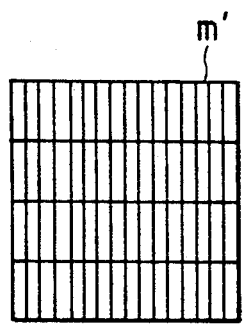
FIG. 16(o")
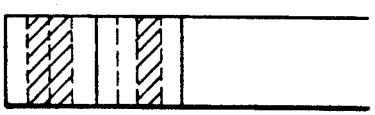
FIG. 16(o''')

IMAGE QUALITY CONTROL SYSTEM FOR AN IMAGE PROCESSING SYSTEM

FIELD OF THE INVENTION

The present invention relates to an apparatus for forming and outputting an image, such as a color copying machine and a color printer. More particularly, the present invention relates to an image quality control system for an image processing system which produces an image of high quality by removing noise and mesh-dot components of an image signal as read from an original.

BACKGROUND OF THE INVENTION

A digital color image forming apparatus, such as a full color copying machine and a full color laser printer, uses four color toners, i.e., Y (yellow), M (magenta), C (cyan), and K (black), and develops and superposes images of those color toners to reproduce a color image. To read an image on an original placed on a platen and to make a color copy, the original image is optically read and the read out signals are converted into developing signals. Thus, four separate copying processes, i.e., one for each color, are required to make a full color copy.

Generally, originals are categorized into character originals, photograph originals, print originals, and originals in which character, photograph, and print coexist (referred to as "integrated" originals). In reproducing a half tone image, such as a photograph, a smoothing process is performed to remove noise and mesh-dot components of the image signal and to improve definition and tone reproduction. Consequently, a smooth halftone image will be provided.

If the process applied to reproduce a halftone image is applied to reproduce a binary image, such as a character image, the edge portions of the binary image will be blurred. That is, in reproducing the binary image, the edge portions must be emphasized to increase the sharpness of the image. Therefore, to reproduce both photographic and character images with satisfactory levels of picture quality, it is necessary to compromise between the smoothing process, such as removal of the noise and mesh-dot component, and the edge emphasis process. In other words, edge emphasis processing must be performed to an extent that the image is not blurred, while at the same time the image signal must be improved to facilitate the reproduction of halftone images, such as photographs.

If the smoothing process and the edge emphasis process are applied to a character original, photograph original, print original, and integrated original, the resultant image will not be too bad in image quality as a whole. However, when individual images are examined the reproduced image of the photograph original looks rough or unsmooth, because the edge portions are somewhat emphasized. Some blur will be noticeable in the reproduced image of the character original. Clearly, it is difficult to reproduce halftone images and binary images such that both have excellent image quality.

While optimal smoothing processes and edge emphasis processes have been known for halftone images and binary images, the mere combination of these processes has not resulted in reproducing integrated images with satisfactory image quality. It has proven to be difficult to select parameters so that both halftone and binary images have satisfactory image qualities.

It is common for copying machines to provide a reduction/enlargement function. The parameters for the smoothing and edge emphasis processes are selected for 100% magnification. Accordingly, when a copy is made in a reduction mode or an enlargement mode, the picture quality of the reproduced image is deteriorated. To be more specific, in the case that an image is enlarged or reduced and the parameters for the smoothing process and the edge emphasis process as optimally set at 100% magnification are used, unnatural image emphasis will be observed in the reproduced image. An enlarged image will suffer from detail blur, and any detail blur noticeable at 100% magnification will be even more noticeable when the image is enlarged. When the image is reduced, the removal of Moire is imperfect and appears in the reproduced image.

SUMMARY OF THE INVENTION

An object of the present invention is to provide an image signal of high quality for photograph, character, print, and integrated originals.

Another object of the present invention is to optimize the process parameters for smoothing and edge emphasis processes.

Yet another object of the present invention is to provide an easy adjustment of image sharpness.

An additional object of the present invention is to prevent deterioration of image quality, due to reduction/enlargement processing.

These and other objects are achieved by an image quality control system for an image processing system for producing an image of high quality by removing noise and mesh-dot components from image input signals representing a scanned original image, the image quality control system comprising a low-pass smoothing filter adapted for removing from image input signals representing a halftone image substantially all of any mesh-dot component, for smoothing the image input signals representing the halftone image, and for producing smoothed output signals representing the smoothed image input signals, a smoothing modulation table for modulating the smoothed output signals of the smoothing filter to produce modulated smoothed output signals, a bandpass edge detect filter for detecting edge component signals of the image input signals, the edge component signals comprising a high frequency component of the image input signals, the edge detect filter producing edge output signals, an edge emphasis modulation table for modulating the edge output signals to produce modulated edge output signals, and means for selecting parameters of the bandpass edge detect filter, the low-pass smoothing filter, the smoothing modulation table, and the edge emphasis modulation table for every image signal such that the modulated edge output signals and the modulated smoothed output signals correspond to the image input signals with the noise and mesh-dot components thereof substantially removed.

BRIEF DESCRIPTION OF THE DRAWINGS

The manner by which the above objects and other objects features and advantages of the present invention are attained will be fully apparent from the following detailed description when it is considered in view of the accompanying drawings, wherein:

FIGS. 13(a) through 13(f) diagrams showing the contents set in the LUTs used in the system of the present invention;

FIG. 14 is a waveform diagram showing table setting timings;

RELATED APPLICATIONS

The subject matter of the present application is related to that of U.S. Pat. application Ser. No. 424,880 now U.S. Pat. No. 5,032,903 filed Oct. 19, 1988, entitled "Edge Processing For Color Image Processing System" and assigned to the assignee of the present application. The subject matter of the 424,880 application is hereby incorporated by reference.

DETAILED DESCRIPTION

Figure 1:
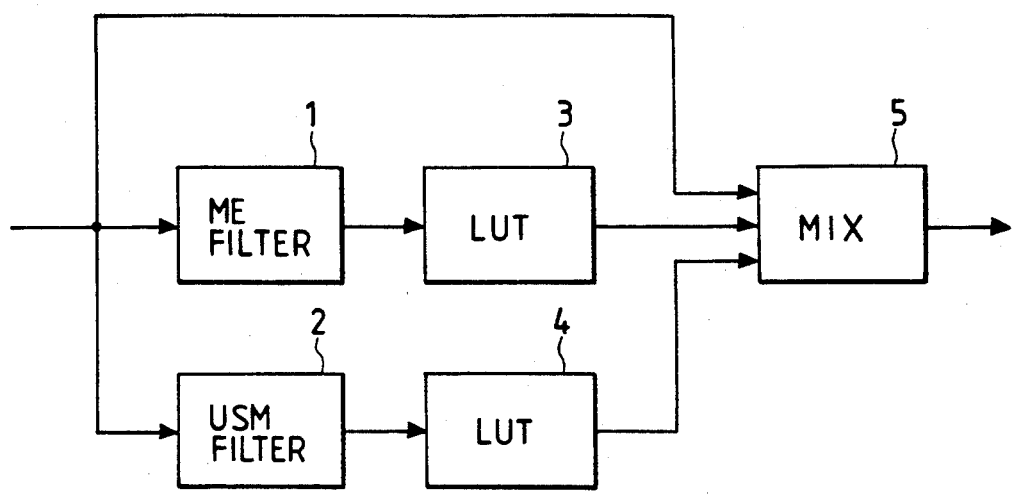
FIG. 1 is a block diagram showing an embodiment of an image quality control system for an image processing system according to the present invention.

The present invention provides an image quality control system for an image processing system which produces an image of high quality by removing noise and mesh-dot components of images. The image quality control system, as shown in FIG. 1, comprises a low-pass smoothing filter 1 for removing the mesh-dot component and smoothing a halftone image, a smoothing modulation table 3 for modulating an output signal of the smoothing filter, a band-pass edge detect filter 2 for detecting edge portions consisting of high frequency components, and an edge emphasis modulation table 4 for modulating an output signal of the edge detect filter. The parameters of the filters and the modulation tables are changed for every image signal, and the signals as subjected to the smoothing process and the edge emphasis process, are composed by a mixer 5 to control image quality. In the standard setting, parameters of the smoothing filter and the edge detect filter are selected under the condition that a cut-off point is set at a spatial frequency near about 133 lines. Original modes of character, photograph, and print, in addition to integrated originals as a standard mode, are provided in order to improve better reproduction of characters, photographs, and prints. The parameters are changed according to the modes to switch from one to the other by an area signal.

Since parameters are changed and selected according to area signals of the character, photograph, print, and integrated originals, the smoothing process and the edge emphasis process are appropriately carried out. As a result, for a character original, a reproduced binary image is appropriately edge emphasized and sharp in configuration. Reproductions of photograph originals and halftone images look smooth.

For an image signal of an integrated original, a cut-off point of the edge modulation table is set at 0.24 of the maximum value, a converted value of the maximum value is set at 0.71 of the maximum value, and a point where asymptotic lines of a modulation curve intersect is set at a point equal to or near a point defined by a value to be converted that is 0.47 of the maximum value and the converted value that is 0.63 of the maximum value. The parameter of the edge emphasis table in the minus side is set to be $\frac{1}{2}$ to $\frac{1}{4}$ of that in the plus side.

For an image signal of a character original, emphasis in the edge emphasis modulation table is more intensive than that in the mode of an image signal of the coexist original. For an image signal of a photograph original, emphasis in the edge emphasis modulation table is set to be between the emphasis for an integrated original and a character original. For the image signal of a photograph original, the emphasis in the edge emphasis modulation table is less intensive than that in the mode of an image signal of the integrated original. In this way, the edge emphasis parameters can be set according to the modes of the respective signals.

The conversion characteristic of the smoothing modulation table is arranged such that for the image signal of a character original, the smoothing process is cut, for a photograph original the values in only the low frequency region are converted, and for print and integrated originals, the output signal of the smoothing filter is unchanged. In this way, the smoothing parameters can be set according to the modes of the respective signals.

For image signals of integrated and photograph originals, to soften the sharpness of the image, the cut-off point of the smoothing filter is reduced, and the emphasis in the edge emphasis modulation table is made less intensive. To increase the sharpness, the emphasis in the edge emphasis modulation table is made more intensive.

For an image signal of a character original, sharpness is adjusted by modulating the value of the edge emphasis table according to the magnitude of the sharpness For a print original, the sharpness is decreased by reducing the cut-off point of the smoothing filter, and is strengthened by increasing the emphasis in the edge emphasis modulation table. In this say, the sharpness for the respective originals can be finely adjusted by changing the parameters according to the modes of the respective image signals.

In reduction/enlargement mode, the parameters of the smoothing filter and the edge emphasis modulation table are changed according to the level of magnification. In the reduction mode, the emphasis of the edge emphasis modulation table is increased. In the enlargement mode, the characteristic curve is translated so as to decrease the emphasis of the edge emphasis modulation table, and at the same time, a cut off point of the smoothing filter is incrementally shifted. The parameters are changed stepwise, and further are changed approximately at mid point between the regular magnifications.

Further, the parameters are changed according to the mode of the image signal of the original, as well as the selected sharpness and magnification. With this feature, even in the reduction/enlargement process in the respective original modes, deterioration of the picture quality can be prevented, and the emphasis of the sharpness can be adjusted.

A color copying machine will be described as the image processing system, however, it should be understood, that the present invention may be applied for other image processing systems, such as a printer, facsimile, and the like.

(I) Picture Quality Control Circuit

When a conventional linear filter is used for removing noise and mesh-dot components, the edge portions of characters, for example, are impaired, resulting in an unsatisfactory image quality for a copy. To remove noise and mesh-dot components without degrading the edge portions, it is necessary to use a nonlinear filter. Many types of nonlinear filters for image signals have been proposed which fall into the following categories:

(1) a nonlinear filter based on the series expansion of a nonlinear function,
(2) a nonlinear filter based on the combination of a nonstorage nonlinear conversion and a nonlinear filter,
(3) a nonlinear filter based on the nonlinear control of filter coefficients,
(4) a nonlinear filter based on having segmentally linear filter coefficients,
(5) a nonlinear filter in which signal values within a filter window are rearranged, and
(6) a nonlinear filter based on the analysis of signal threshold values.

In order for a digital color copying machine to reproduce various types of input images exactly, it is required to remove mesh-dot components possibly causing noise and Moire, while at the same time to make the edge portions of characters more sharp. To realize this by the nonlinear filter, the following two elements are needed;

(1) a filter that is capable of removing noise and mesh-dot components which preserves the edge portions, and
(2) a filter that does not emphasize noise but emphasizes only the edge portions.

Figure 2A:
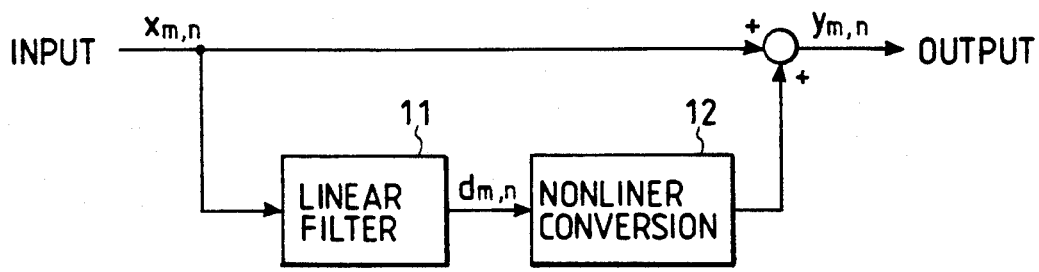
FIGS. 2(a) and 2(b) are schematic illustrations of two filters of the nonlinear type which may be used in the image quality control system of FIG. 1.
Figure 2B:
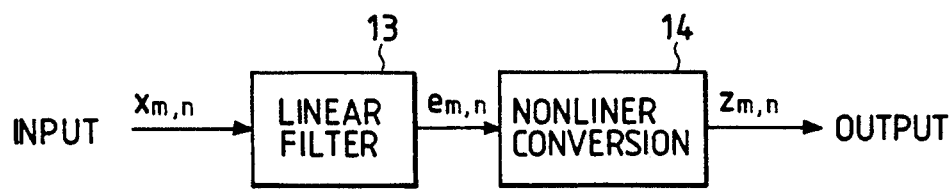
Figure 3A:
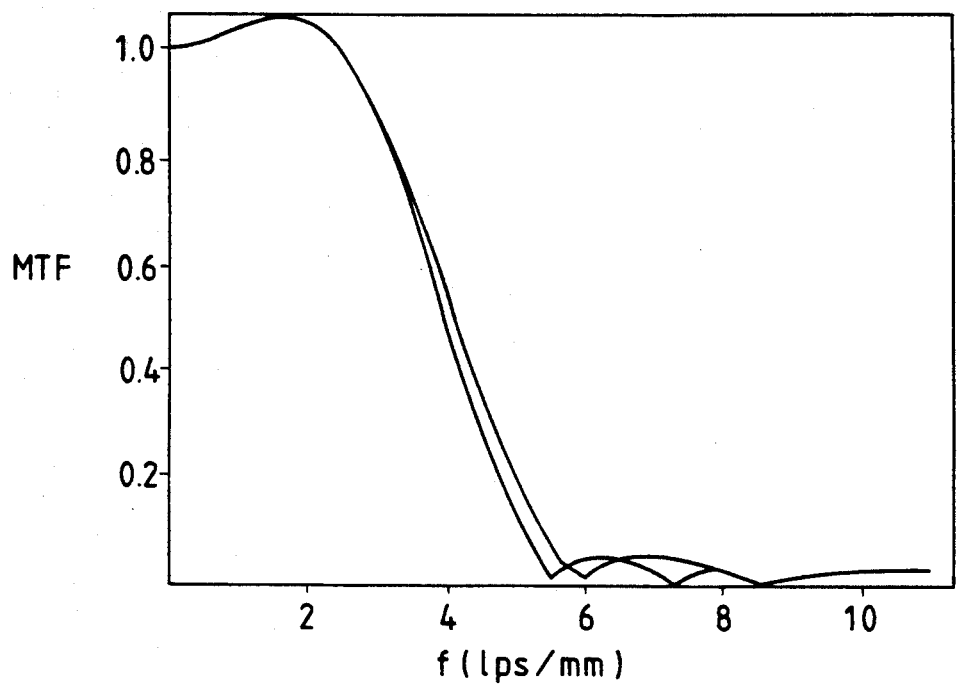
FIGS. 3(a) and 3(b) are graphs for explaining frequency characteristics of the nonlinear smoothing filters.
Figure 3B:
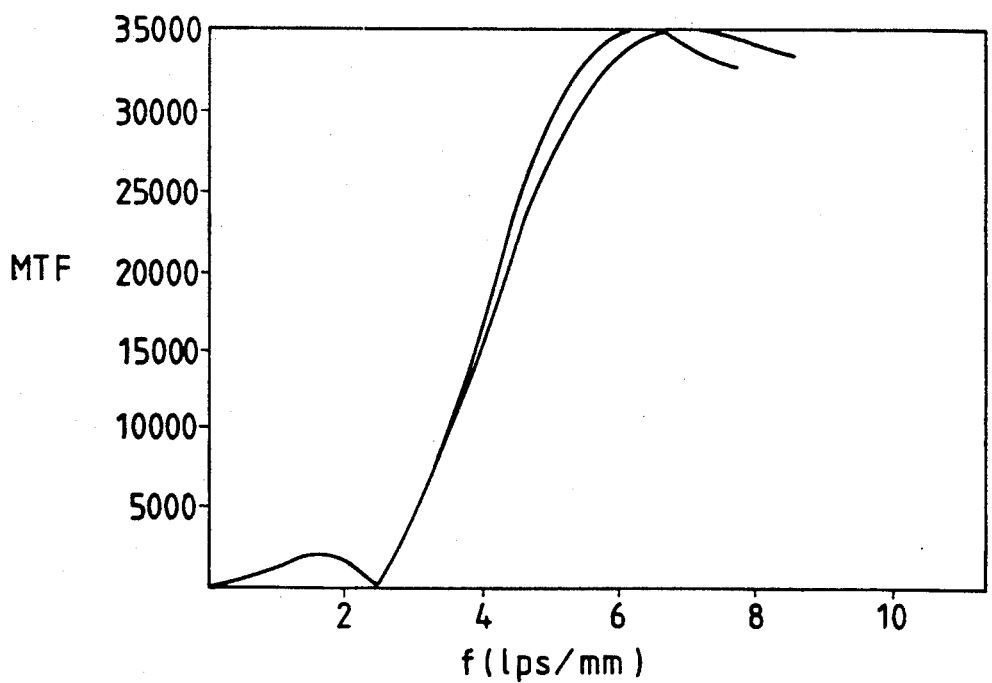
Figure 4:
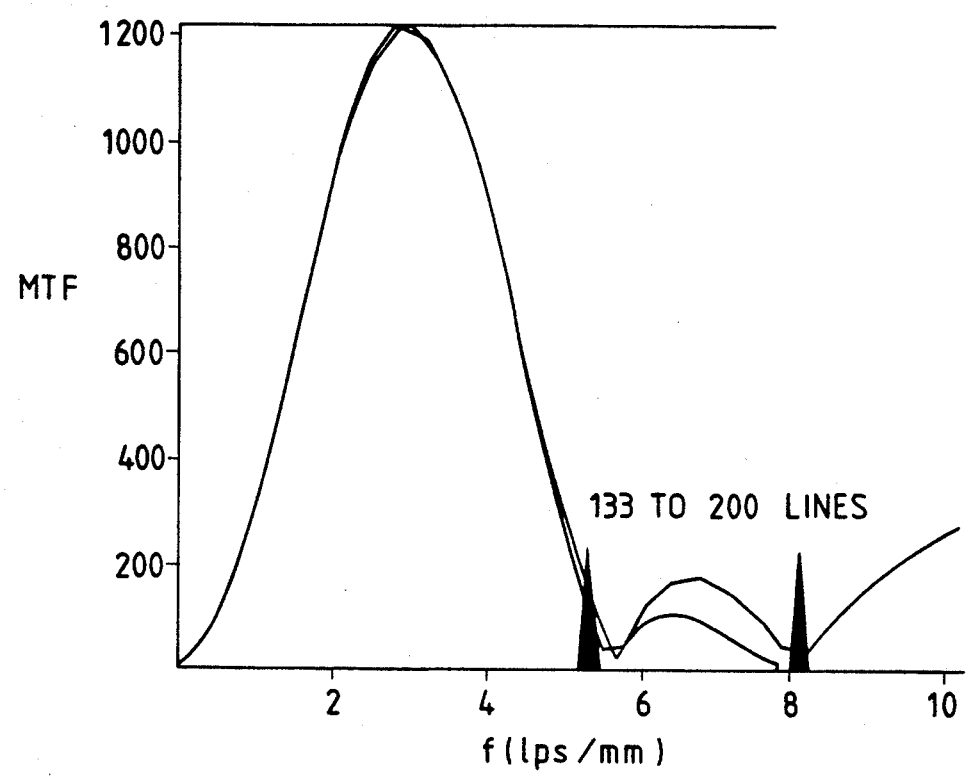
FIG. 4 is a graph for explaining an edge emphasis filter.
Figure 5:
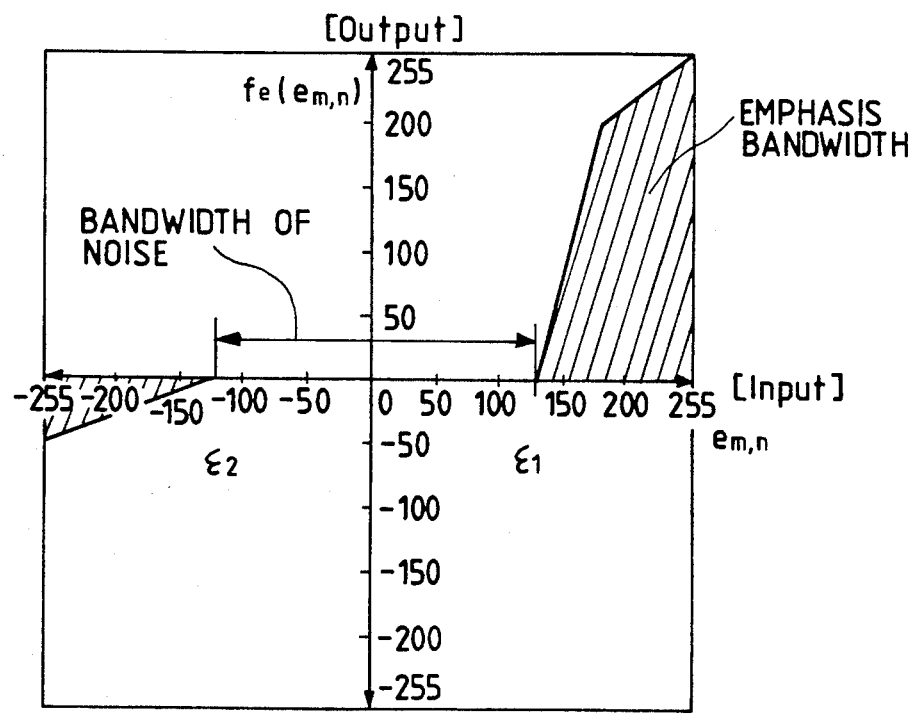
FIG. 5 is a graph for explaining an edge emphasis nonlinear conversion.

FIGS. 2(a) and 2(b) show schematic illustrations of two filters (both of the nonlinear type). FIGS. 3(a) and 3(b) show graphs for explaining frequency characteristics of the nonlinear smoothing filters. FIG. 4 shows graphs for explaining an edge emphasis filter. FIG. 5 shows graphs for explaining an edge emphasis nonlinear conversion.

(I-1) Nonlinear Smoothing Filter

In the nonlinear smoothing filter of FIG. 2(a), a coefficient of a low-pass filter whose DC component is 1, is given by $$\sum_{i=-N/2}^{N/2} \sum_{j=-N/2}^{N/2} a_{ij}' = 1 \quad (1)$$

where the number of taps of a two-dimensional linear smoothing filter 11 is $(N+1) \times (N+1)$. In a normal filter, N is an even number. A coefficient $a_{k,l}'$, which is used in the linear smoothing filter 11, is a coefficient with a zero DC component, viz., as obtained by subtracting 1 from the center coefficient of $a_{k,l}'$ and is given by $$\sum_{k=-N/2}^{N/2} \sum_{l=-N/2}^{N/2} a_{k,l} = 0 \quad (2)$$

where $$0 = \begin{matrix} a_{-N/2,-N/2} & \ldots & a_{0,-N/2} & \ldots & a_{N/2,-N/2} \\ a_{-N/2,0} & \ldots & a_{0,0} & \ldots & a_{N/2,0} \\ a_{-N/2,N/2} & \ldots & a_{0,N/2} & \ldots & a_{N/2,N/2} \\ a_{-N/2,-N/2} & \ldots & a_{0,-N/2} & \ldots & a_{N/2,-N/2} \\ a_{-N/2,0} & \ldots & a_{0,0} & \ldots & a_{N/2,0} \\ a_{-N/2,N/2} & \ldots & a_{0,N/2} & \ldots & a_{N/2,N/2} \end{matrix} \quad (3)$$

Then, an output signal $d_{m,n}$ of the linear smoothing filter 11 is $$d_{m,n} = \sum_{k=-N/2}^{N/2} \sum_{l=-N/2}^{N/2} a_{k,l} \cdot X_{m+k,n+1} \quad (4)$$

A frequency characteristic of the filter expressed by $a_{k,l}'$ provides a high-pass filter in which the phase is inverted at a gain of 1 of the passband as shown in FIG. 3(b), in the case of a low pass filter whose $a_{k,l}'$ characteristic is as shown in FIG. 3(a). Accordingly, the filter output exhibits small values for noise in the region where the image is flat or where the frequency is not high, and large values for edges of the image, for example. Generally, the filter output value becomes small in the order of the edge portion, mesh-dot portion, and the flat portion.

A function F(d) is introduced into the filter output by using a nonlinear converter 12. The function F(d) is given, for example, below $$F_{m,n} = \begin{cases} d_{m,n} & \text{where } |d_{m,n}| \leq th \\ 0 & \text{where } |d_{m,n}| > th \end{cases} \quad (5)$$

Accordingly, an output signal $Y_{m,n}$ of a nonlinear ME filter is expressed as $$Y_{m,n} = \begin{cases} X_{m,n} + d_{m,n} & \text{where } |d_{m,n}| \leq th \\ X_{m,n} & \text{where } |d_{m,n}| > th \end{cases} \quad (6)$$

An output $y_{m,n}'$ of the low-pass filter $a_{k,l}'$ when the DC component is 1 is $$\begin{aligned} Y_{m,n}' &= \sum_{k=-N/2}^{N/2} \sum_{l=-N/2}^{N/2} a_{k,l} \cdot X_{m+k,n+1} \\ &= X_{m,n} + \sum_{k=-N/2}^{N/2} \sum_{l=-N/2}^{N/2} a_{k,l} \cdot X_{m+k,n+1} \\ &= X_{m,n} + d_{m,n} \end{aligned} \quad (7)$$

As seen, the equation $y_{m,n}'$ is equal to the equation $Y_{m,n}$ under the condition of $|d_{m+n}| < \text{th}$. The output signal $y_{m,n}$ of the nonlinear smoothing filter is used when the linear low-pass filter is applied. When $|d_{m+n}| < \text{th}$, the input signal $X_{m,n}$ is outputted as it is.

As seen from the above, if the threshold value "th" is set at a point where the edge portion may be separated from the remaining portion, the edge portion may be kept as it is while the remaining portion can be smoothed.

As described above, it is possible to remove the mesh-dot components by the nonlinear smoothing filter, and in some cases, to preserve the edge components. Use of only the nonlinear smoothing filter cannot solve the problem of poor character reproduction due to edge deterioration by the dither processing that follows the filter processing. On the contrary, to cope with this it is necessary to emphasize the edge portions.

(I-2) Nonlinear Edge Emphasis Filter

For edge emphasis it is necessary to pick up and emphasize the edge portions of characters and the like independently of noise in the high frequency region and the mesh-dot components. To this end, a nonlinear edge emphasis filter is composed of two components, a linear edge emphasis filter 13 and a nonlinear converter 14. A filter having a characteristic as shown in FIG. 4, for example, is used for the linear edge emphasis filter 13. As seen from the figure, the filter 13 is of the band-pass type, and is designed to detect the edge components except the components of a mesh-dot original of 133 lines (5.2 lps/mm) to 200 lines (7.9 lms/mm) that is assumed to be an input original.

The output value of the linear edge emphasis filter contains a slight noise component. To remove this, as in the case of the nonlinear smoothing filter, the output signal is converted by a nonlinear converter 13 (including a LUT) for example, into a signal to emphasize the edge portions that does not contain the noise component.

An output signal $Z_{m,n}$ of the nonlinear edge-emphasis filter shown in FIG. 2(b) is given by $$Z_{m,n} = f_e(e_{m,n}) \quad (8)$$
$$= f_a \sum_{k=-N/2}^{N/2} \sum_{l=-N/2}^{N/2} b_{k,l} \cdot X_{m+k,n+l}$$

where $e_{m,n}$ is an output signal of the edge detect filter 13, and $b_{k,l}$ is a coefficient of the filter 13, and is expressed by $$\sum_{k=-N/2}^{N/2} \sum_{l=-N/2}^{N/2} b_{k,l} = 0 \quad (9)$$

A converting function "$f_e$" of the nonlinear converter 14 is set up as shown in FIG. 5, on the assumption that the values of the noise and the mesh-dot components are small. As shown, threshold values $E_1$ and $E_2$ are provided, and a region of the input signal between the threshold values is recognized as a noise band, and 0 is output within the noise band. The remaining region is emphasized as an emphasis region.

By combining the nonlinear smoothing filter and the nonlinear edge emphasis filter, the filter required for the digital color copying machine as shown in FIG. 1 can be constructed.

(I-3) Parameters and Original Modes

Figure 6:
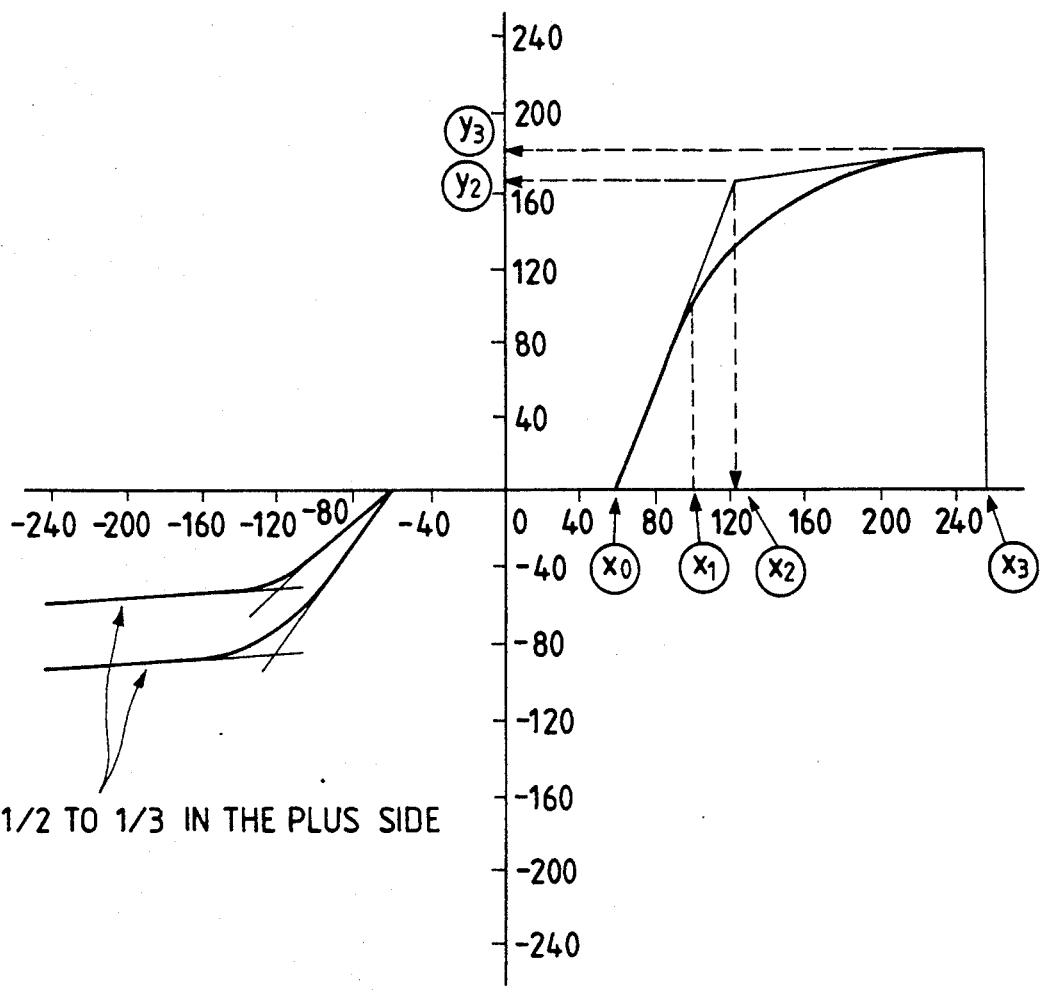
FIG. 6 is a graph for explaining a converting characteristic of the edge-emphasis nonlinear converter.
Figures 7A, 7B, 7C:
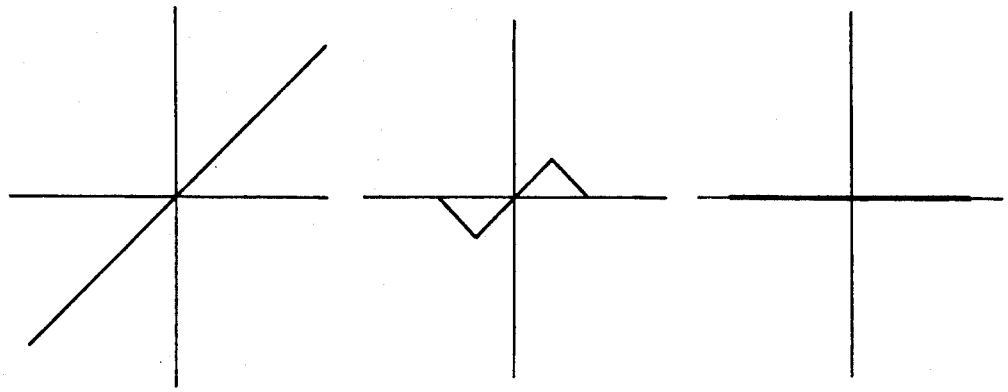
FIGS. 7(a) through 7(c) are graphs for explaining a converting characteristic of the..smoothing nonlinear converter.

FIG. 6 shows a graph for explaining a converting characteristic of the edge-emphasis nonlinear converter. FIGS. 7(a) through 7(c) show graphs for explaining a converting characteristic of the smoothing nonlinear converter.

A converting characteristic of the edge emphasis modulation table (LUT) for making an edge emphasis nonlinear conversion can be defined by a value at a point where the characteristic curve "y" (converted value) starts to rise with respect to a maximum value of "x" (value to be converted), a value at a point where asymptotic lines intersect, a value in the x-direction at a tangential point of the asymptotic line touching the characteristic curve, and the like. If a standard mode is assigned to an original in which a photograph, print, and character data coexist (referred to as an integrated original), a converting characteristic in the positive direction is set up as follows: in the scale of 255 gray levels, as shown in FIG. 6, a value xo at the rise point is 60±20 (approximately 0.24 of the maximum value 255), a value y3 of the value "y" with respect to the maximum value x3 = 255 of the value "x" is 180±20 (approximately 0.71 of the maximum value 255), values x2 and y2 at the cross point of the asymptotic line are 125±20 (approximately 0.47 of the maximum value 255) and 160±20 (approximately 0.63 of the maximum value 255), and an x-direction value x1 at the tangential point of the asymptotic line is 100 ±20 (approximately 0.39 of the maximum value 255). In the converting characteristic in the negative direction, those figures are selected to be within a range of $\frac{1}{2}$ to $\frac{1}{4}$. With the conversion characteristics thus constructed, an image reproduced is good in image quality, as a whole.

In a print mode, if mesh-dots are picked up or the degree of emphasis is increased, a reproduced image will look rugged. To avoid this, the whole characteristic curve is shifted to the right (as viewed in the drawing), to weaken the emphasis, and the values xo and y3 are selected: xo >80 and y3 <160. In a character mode, to emphasize the edge portions and to provide sharp characters, the whole characteristic curve is shifted to the left (opposite to that in the case of the print mode), to increase the degree of the emphasis. In this instance, xo <40 and y3 >200. In a photograph mode, the edge portions must be emphasized to some degree in order to reproduce an image in excellent details. To this end, the setting of the characteristic curve is between the settings of those in the print mode and character mode, and preferably closer to the setting in the character mode.

In the print mode, the rise point is located to the right and the emphasis is weaker than in the standard mode. Accordingly, it is necessary to avoid detecting too much edge and to avoid the introduction of graininess. In the photograph mode, the rise point is located more to the left and the emphasis is more intensive than in the print mode. In the character mode, the rise point is shifted still further to the left. The emphasis is much more intensive.

A conversion characteristic of the smoothing modulation table that is for the smoothing nonlinear conversion, is designed such that in the standard mode (for the integrated original) and the print mode, the output signal of the smoothing filter is outputted without change as shown in FIG. 7(a). In the photograph mode as shown i FIG. 7(b), the filter output is cut to the extent that the edge component does not become dull. In the character mode as shown in FIG. 7(c), the smoothing processing is not carried out to prevent the edge component from becoming dull.

(I-4) Parameters and Sharpness

Figure 8A:
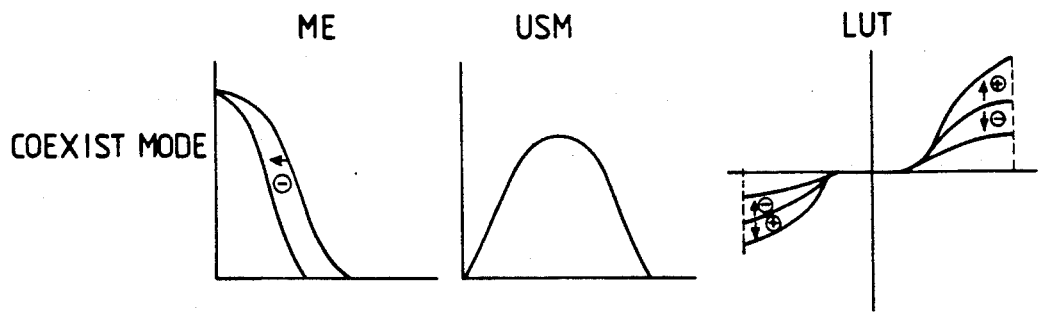
FIGS. 8(a) through 8(d) are diagrams for explaining the changing of the parameters in a sharpness mode.
Figure 8B:
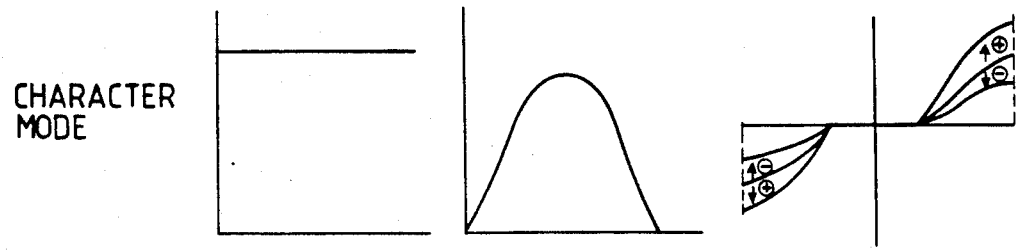
Figure 8C:
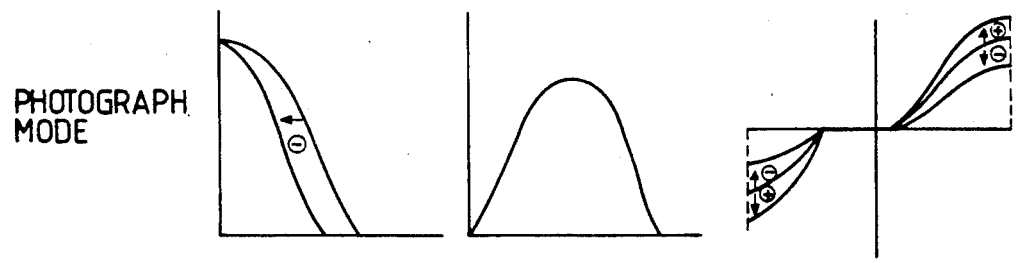
Figure 8D:
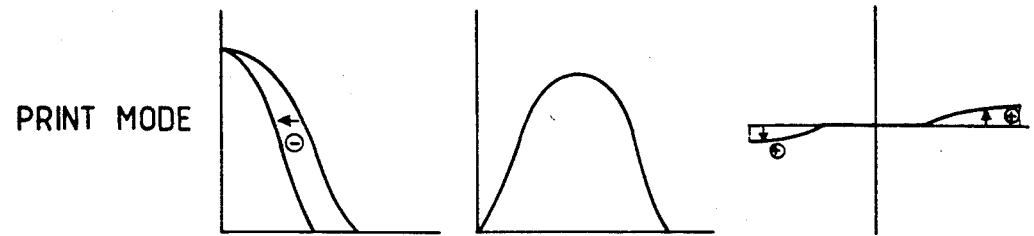

FIGS. 8(a) through 8(d) shows diagrams for explaining the changing of the parameters to vary the sharpness of an image. The parameters are stepwise changed in the positive and negative directions. For the parameters of sharpness 0, the emphasis by the edge emphasis modulation table (LUT) is intensive in the plus side, as shown in FIG. 8(a). In this case, the smoothing filter (ME) for removing the mesh-dot component is not altered so as to prevent Moire from occurring also in the sharpness plus side. An amount of edge emphasis is adjusted by using only the edge emphasis modulation table (LUT). In the adjustment, the edge emphasis (USM) filter remains fixed, with the proper selection of the parameters. This process is true for every mode. In the minus side, the emphasis of the edge emphasis modulation table is made less intensive and a cut-off point of the smoothing filter is decrementally shifted. The edge emphasis filter remains fixed. In the print mode, the emphasis of the edge emphasis modulation table may remain unchanged, because it is set at a less intensive point as already stated. In the character mode, only the edge emphasis modulation table (LUT) is used for the sharpness adjustment, because the smoothing filter is not used.

In the adjustment of sharpness, if the cut-off point of the smoothing filter is decrementally shifted, for example, in the plus side, detail blur is improved to make the image more sharp, but Moire occurs. In this respect, it is not preferable to use the shifting of the cut-off point of the smoothing filter for sharpness adjustment in the plus side. It is not preferable that the sharpness in the plus side be adjusted by using only the shifting of the cut-off point of the smoothing filter. In this case, if the edge emphasis is intensive, an intensive edge appears in the smoothed image, and the resultant image looks unnatural. The above adjustment of the edge emphasis modulation table and the smoothing filter makes fine adjustment easy to provide a sharp image.

For sharpness adjustment based on the alteration of the edge emphasis modulation table, the modulation table must be altered within a limited threshold value. In the plus side, in excess of the threshold value a spot edge appears in the image in the high density region. Below the threshold value, the density is insufficient in the sharpness minus side. The edge emphasis modulation table may be altered in a manner that the maximum point is fixed and the cut-off point is shifted. When this alteration method is used, the image appears rough in the plus side and spot noise appears in the image. Below the threshold value, the meshdot component is also emphasized, to cause Moire. In the minus side, only the area of intensive emphasis is emphasized, and the resultant image looks unnatural.

A translating method is also available for the alteration of the modulation table. When this method is used, the effect of combining the above two methods are obtained. If any of the above methods is used, the table alteration must be done within a range where the image suffers from no defect. Within such a range, the two methods may be combined. In this case, the translating method is used for the intensive region in the sharpness plus side.

(I-5) Parameters and Reduction/Enlargement

Figure 9A:
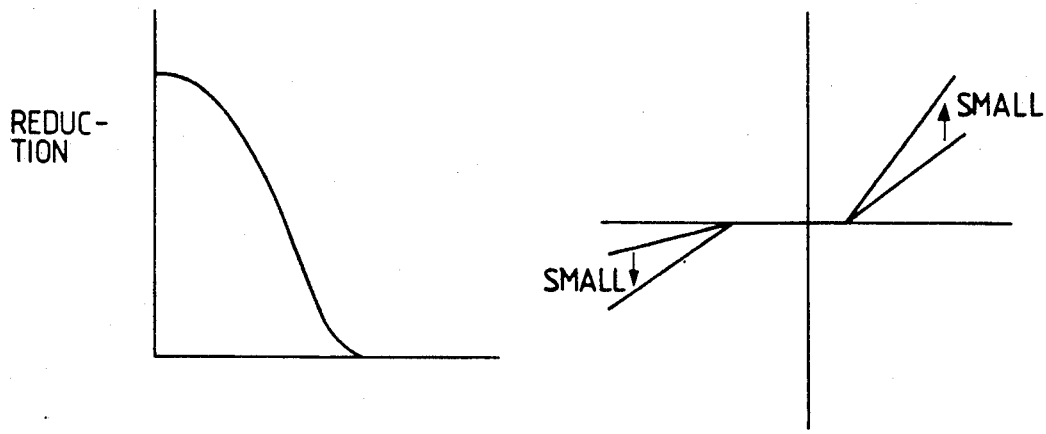
FIGS. 9(a) and 9(b) are graphs for explaining the change of parameters in response to selection of reduction/enlargement.
Figure 9B:
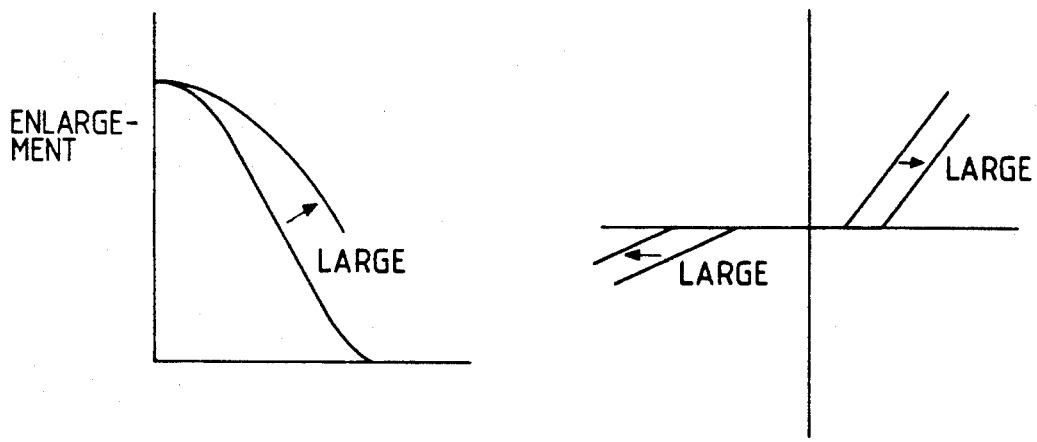
Figure 10:
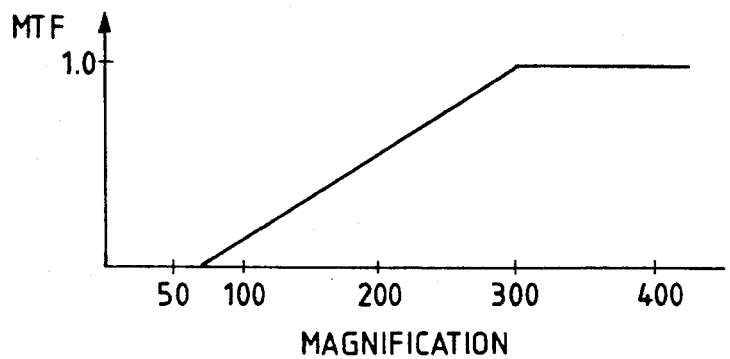
FIG. 10 is a graph showing a curve representing a variation of the parameters with respect to- magnification.

FIGS. 9(a) and 9(b) are graphs for explaining the change of parameters for reduction/enlargement. FIG. 10 is a graph showing a curve representing a variation of the parameters with respect to magnification.

As already described, when the reduction/enlargement processing is carried out, the parameters are applied to an image whose image quality is set up at 100% magnification. In a reduction mode, thin-out Moire is incompletely removed. In an enlargement mode, detail blur that is not noticeable at 100% magnification becomes noticeable.

In the reduction mode, to change the parameter, the smoothing filter remains unchanged or the cut-off point is decrementally shifted, as shown in FIG. 9(a), and the emphasis of the edge emphasis modulation table is made more intensive. With this adjustment, the problem that image reduction weakens edge emphasis to possibly cut thin lines can be solved.

In the enlargement mode, to change the parameter, the cut-off point of the smoothing filter is incrementally shifted, as shown in FIG. 9(b), and the emphasis of the edge emphasis modulation table is made less intensive. With this, the MTF of the smoothing filter is increased to make the blur noticeable. The enlargement makes the edge emphasis too intensive and consequently the image appears unnatural. Further, the frequency components of the image change to emphasize the mesh-dot component as well as the edges. As a consequence, Moire occurs and the graininess of the image is impaired. In the instant adjustment, however, the problems as just mentioned are successfully solved, because edge emphasis is weakened.

A relationship between the MTF of the smoothing filter at the spatial frequency 4 (lps/mm) and magnification is shown in FIG. 10. The parameters of the smoothing filter may be adjusted so that the MTF is varied according to magnification, as shown in FIG. 10. Alternatively, a smoothing filter can be used whose MTF varies according to a predetermined curve. When the edge emphasis is adjusted in the reduction/enlargement mode, an edge detect band of the edge emphasis filter may be changed so that it detects only the edge component without detecting the mesh-dot component. Where the parameters are continuously changed according to magnification as shown in FIG. 10, the number of parameters to be used is increased.

To cope with this, the range of magnification from 50% to 400% may be divided into several ranges and the parameters can be stepwise varied for each part of the range. In this case, when the magnification range is divided at both sides of each frequently used magnifications used or between the adjacent regular magnifications, it is possible to prevent a great change of image quality even if the magnification is adjusted at specific magnifications close to regular magnifications (as 70%, 81%, 86%, 115%, 122%, and 141%) as in the reduction-/enlargement from A size to B size or between the same sizes. If those specific magnification are set at 67%, 77%, 133%, 153%, 177%, 207%, 233%, and 267%, the parameters selected for the 100% magnification are available for reduction/enlargement between 78% and 132%.

In connection with reduction/enlargement processing, smoothing processing and edge emphasis processing follow the reduction/enlargement processing or are followed by the reduction/enlargement processing. In the former case, even in the enlargement mode, no blur occurs and hence good image quality can be obtained; however, the scale of the hardware is increased. In the later case, small scale hardware suffices, but blur in the enlargement mode inevitably occurs. This blur, however, can be removed by shifting the cut-off point in the smoothing filter. The system may be designed such that reduction/enlargement processing is performed before and after smoothing processing and edge emphasis processing, or smoothing processing and edge emphasis processing may be performed before and after reduction/ enlargement processing. In either case, it is evident that the parameters to be set change according to the combination.

In case where the line sensor is used for original image reading, in the main scan direction, the read signal from the line sensor is enlarged or reduced according to the magnification specified. In the vertical scan direction, the read density is controlled by changing the scan speed. Accordingly, the spatial frequency to be filtered in the main scan direction is different from that in the vertical scan direction. There occurs a case that the image between lines is blurred in the main scan direction, but it is not blurred in the vertical scan direction. In such a case, the parameters are selected according to the degree of improvement in each direction.

(I-6) Automatic Setting of Parameters

Figure 11A:
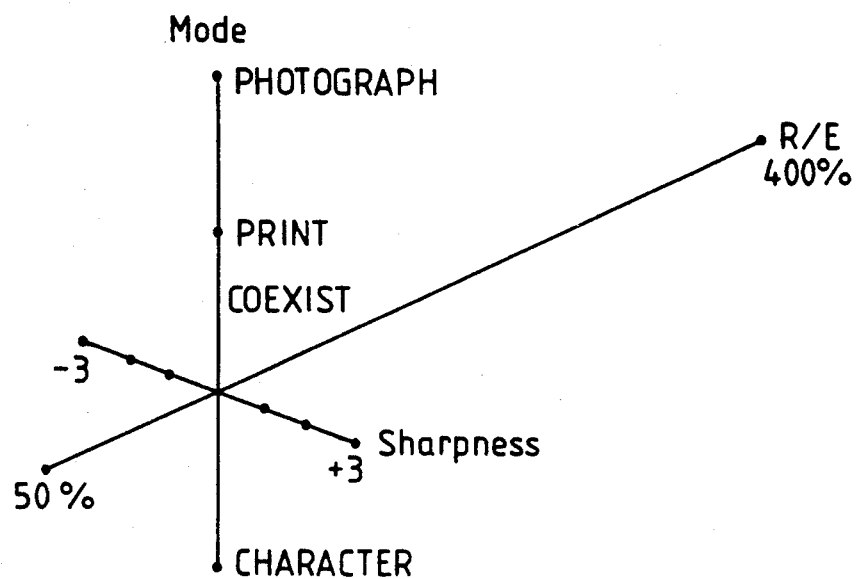
FIGS. 11(a) and 11(b) are diagrams useful in explaining how to automatically set parameters.
Figure 11B:
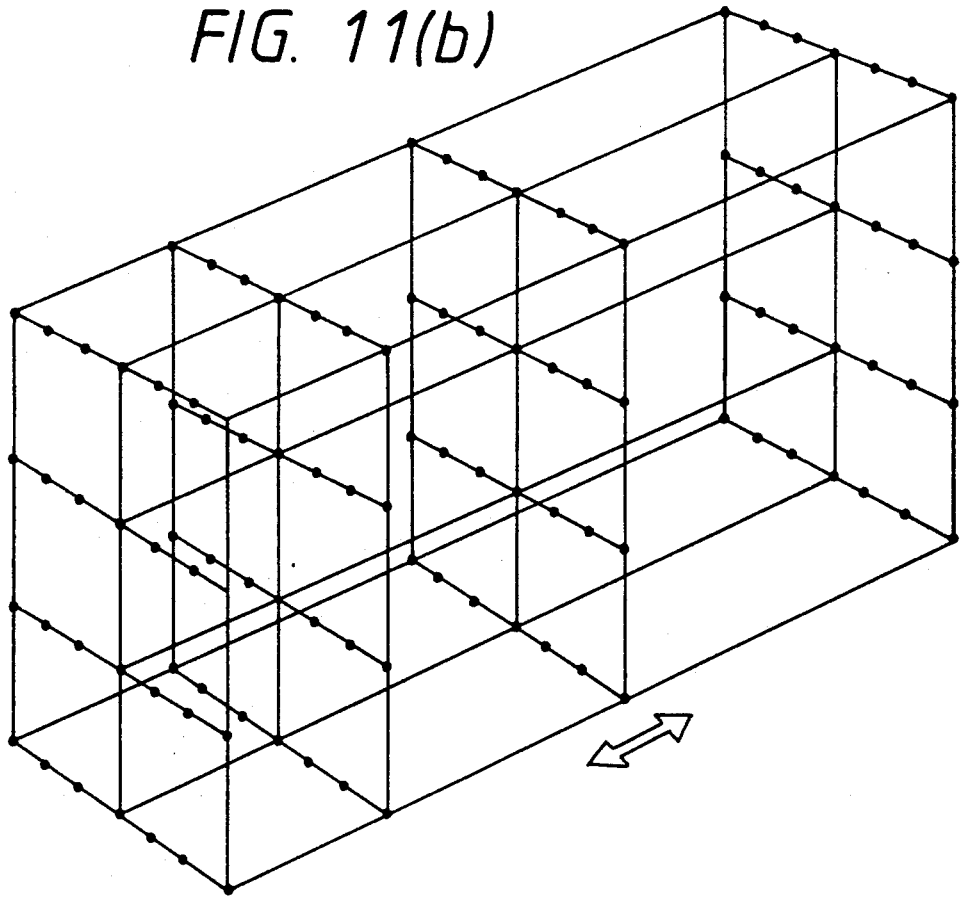

FIGS. 11(a) and 11(b) are diagrams useful in explaining how to automatically set parameters. By changing the parameters for smoothing processing and edge emphasis processing, an image of high image quality can be reproduced even if the original mode, the sharpness, and the magnification are changed. To realize this, it is necessary to preset parameters for edit image quality as defined by a space including three base axes representing the original mode, sharpness, and magnification as shown in FIG. 11(a). In this case, as seen from the foregoing description, those parameters are preset in the following sequence of procedural steps:

(1) to select parameters for the integrated original mode, sharpness 0, and 100% magnification,
(2) to select parameters on the sharpness base axis when the original mode represents an integrated original and the magnification is 100%,
(3) to select parameters on the mode base axis when the sharpness is 0, and the magnification is 100%,
(4) to select parameters for sharpness by the combination of steps (1) and (3) above,
(5) to select parameters on the magnification base axis when the integrated original mode is selected and the sharpness is 0,
(6) to select parameters for magnification by the combination of steps (3) and (5) above and
(7) to select the remaining parameters that are out of the base axes.

Through the above sequence of steps, the parameters in the edit image quality space as shown in FIG. 11(b) are determined. Accordingly, if the present original mode corresponds to an integrated original mode, for example, parameters as determined according to combinations of sharpness and magnification are determined in a plane a defined by the sharpness base axis and the magnification base axis that originate from the integrated original mode. If it is the photograph mode, parameters as determined according to sharpness and magnification are determined in the top plane of the image quality space. This mode has four planes with four original points. In this way, parameters can be selected and changed according to the mode, sharpness, and magnification.

(II) SETTING OF PARAMETERS

Figure 12:
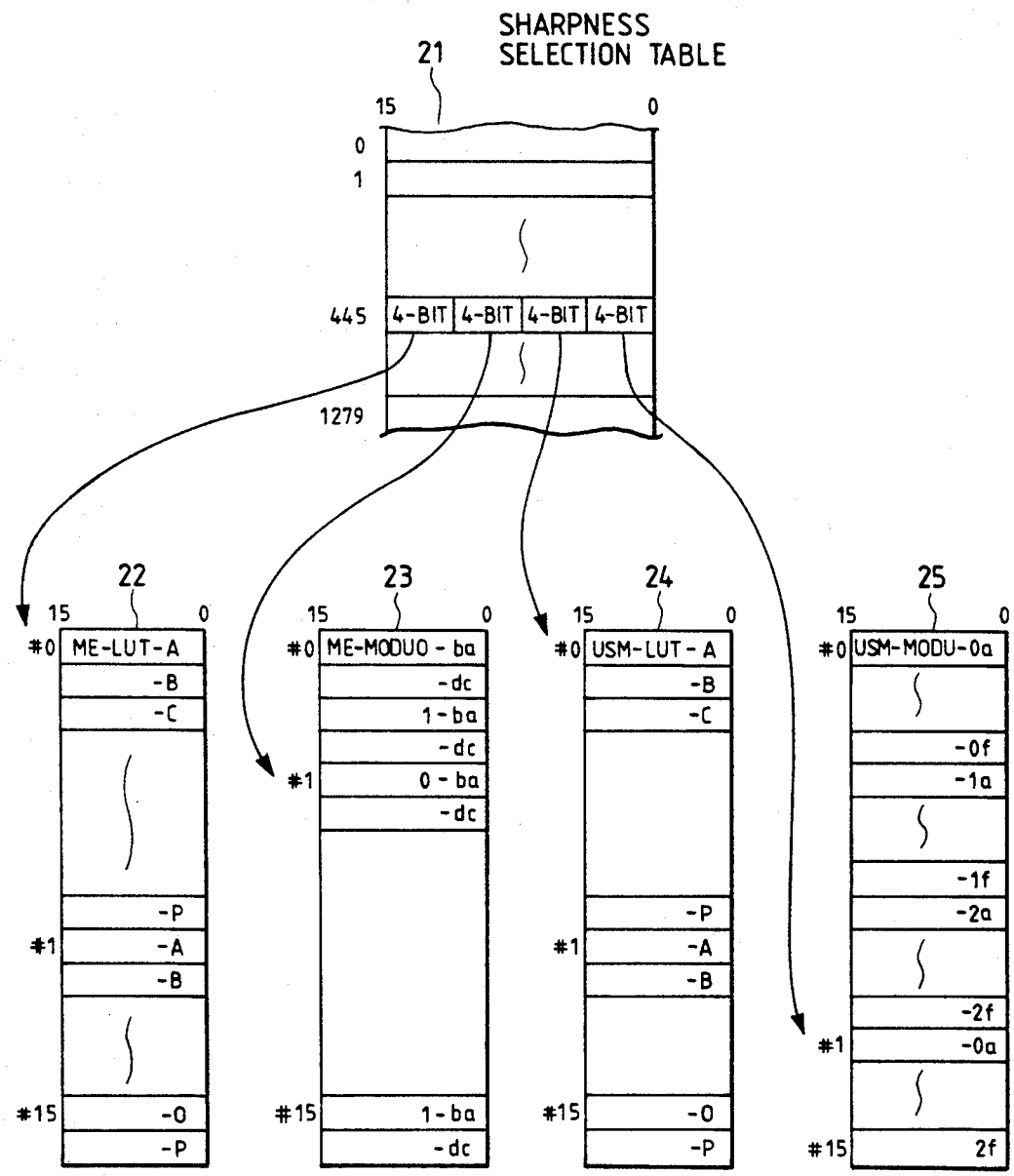
FIG. 12 is a diagram useful in explaining how to set the Lilts of an image processing s (IPS)

FIG. 12 shows a diagram useful in explaining how to set the LUTs of an image processing system (IPS). The description to follow identifies methods to set parameters in the filters and the conversion or modulation tables that are constructed with LUTs, more exactly a method to set filter weighting coefficients in the smoothing filter (ME-LUT) and the edge detect filter (USM-LUT), and a method to set polygonal line approximation data in the smoothing modulation table (ME-MODU-LUT), and the edge emphasis modulation table (USM-MODU-LUT).

In a CPU, a memory, e.g., a ROM, stores a sharpness selection table 21, ME-LUT-n coefficient table 22, ME-MODU-LUT-n polygonal line approximation table 23, USM-LUT-n coefficient table 24, and USM-MODU-LUT-n polygonal line approximation table 25. The CPU determines the coordinates (x, y, z, c) to select sharpness coefficients according to the four parameters of magnification, sharpness adjust value, sharpness mode (photograph, character, print, integrated), and developing color. The CPU obtains retrieval search numbers of the respective tables from the sharpness selection table 1 by using the coordinates. The four parameters may have values set to select the coefficients of the digital filters (DFs) as in the following table.

| Parameters to select Coefficents of DFs | Axes | Range | Number of bits to express |
|---|---|---|---|
| Magnifications (50-100%) | x | 0-8 | 4 |
| Adjustment Value (0-7) | y | 0-7 | 3 |
| Mode (4 modes) | z | 0-3 | 2 |
| Developing Colors (y,m,c,k) | c | 0-3 | 2 |

Further, considering a case where x=3 for 100% magnification, y =3 for a sharpness adjust value of 3, z =3 for the photograph sharpness mode, and c =1 for the developing color of "m," (x, y, z, c) is set up and expressed as (3, 3, 3, 1) in the coordinates system, "0011, 011, 11, 01" in the binary system, and "445" in the decimal system. The CPU accesses the sharpness selection table 21 by using those parameters as address signals, and reads the retrieval numbers for the respective tables out of the sharpness selection table 21, and writes them into the LUTs of the IPS.

Description to follow is elaboration of the write operation into the LUTs.

Figures 13A, 13B, 13C, 13D:
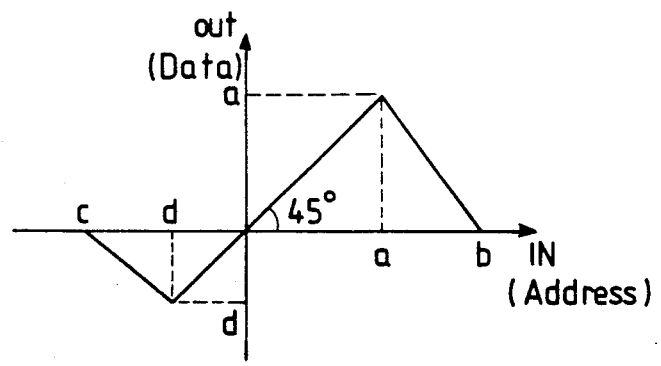

FIG. 13(a) through 13(f) are diagrams showing the contents set in the LUTs. When the digital filter is a two-dimensional (7×7) filter as shown in FIG. 13(a), coefficients A to P are stored in the ME-LUT-n coefficient table and the USM-LUT-n coefficient table. The coefficients are transferred to the IPS in the form of packets, and are stored in the smoothing table (MELUT]and the edge detect table (USM-LUT).

The ME-LUT-n polygonal approximation table stores the coordinates of a polygonal line (FIG. 13(c)) in the form of a data structure shown in FIG. 13(d). The polygonal line is for approximating the contents of the smoothing modulation table ME-MODU-LUT. The polygonal line is formed by connecting four points (c, 0), (d, d), (a, a), and (b, 0) by straight lines. The values as obtained by expanding the coordinates by the CPU are stored into the smoothing modulation table ME-MODU-LUT of the IPS. Zero exists outside of the point [c, b].

The USM-MODU-LUT-n polygonal line approximation table contains the coordinates of a polygonal line, which is for approximating the contents of the edge emphasis table USM-MODU-LUT, as shown in FIG. 13(e). Those coordinates are stored in the form of a data structure shown in FIG. 13(f). The polygonal line is formed by connecting the coordinates (ax, 0), (bx, by). (cx, cy), (dx, dy), (ex, ey), and (fx, 0) by straight lines. The values as obtained by expanding the coordinates by the CPU are stored into the edge emphasis modulation table USM-MODU-LUT. A straight line connecting points b and c, and a straight line connecting points e and d outwardly extend from [d, c].

FIG. 14 is a waveform diagram showing table setting timings. As shown in FIG. 14, the CPU sets the values for the process colors into the smoothing filter (ME-LUT), edge detect filter (USM-LUT), smoothing modulation table (ME-MODU-LUT), and edge emphasis modulation table (USM-MODU- LUT), during a carriage return of an IIT (image input terminal) for reading an original image.

(III) (IPS)

Figure 15:
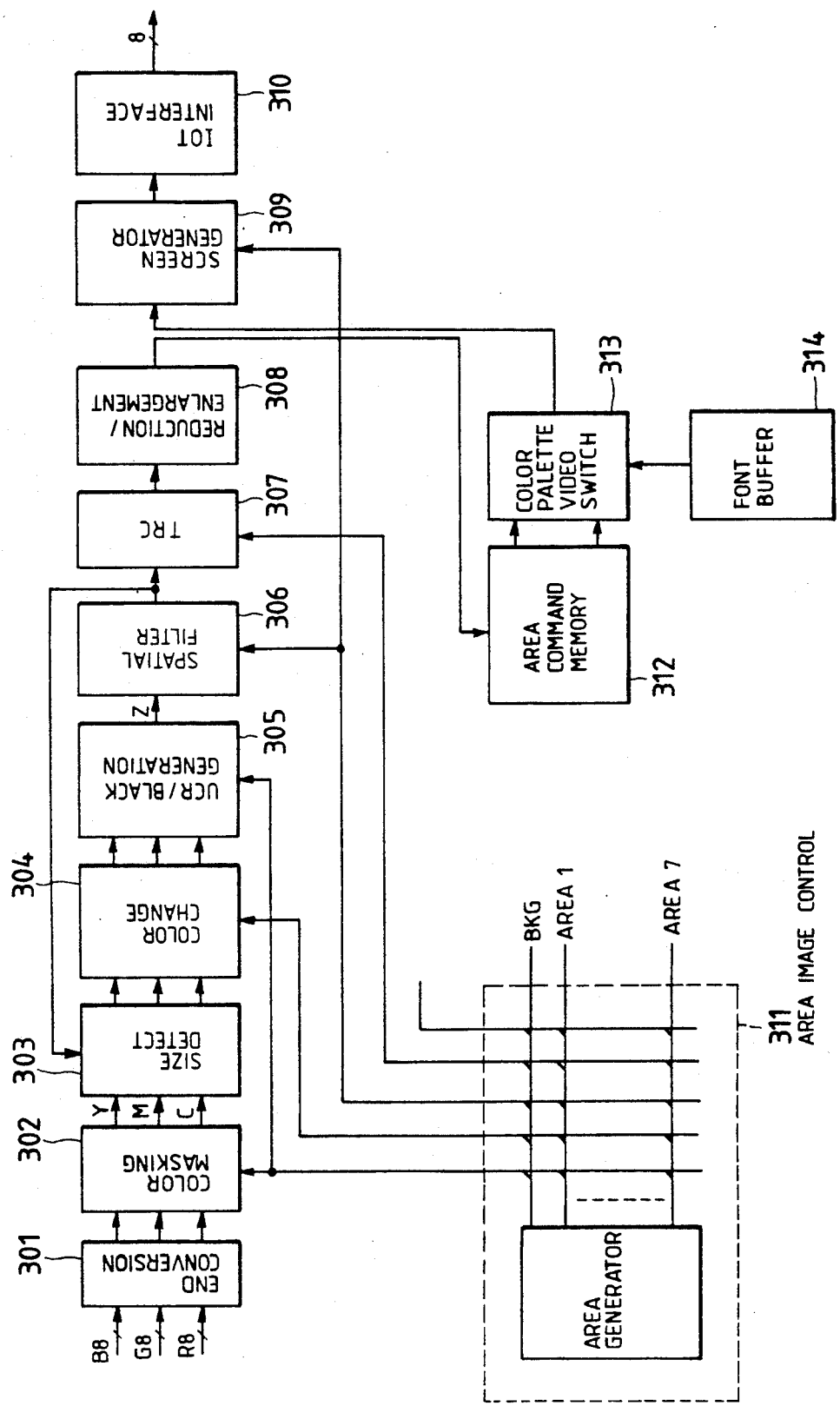
FIG. 15 is a block diagram showing an arrangement of modules in the image processing system (IPS) used in the present invention.

FIG. 15 shows an arrangement of IPS modules in the image processing system (IPS). In the color image recording apparatus, the IIT (image input terminal) reads a color image on an original in the form of three primary colors, B (blue), G (green) and R (red) by using a CCD image sensor, and converts these to signals of primary toner colors of Y (yellow), M (magenta), C (cyan), and K (black or tusche), and the IOT (image output terminal) performs exposure by a laser beam and development to reproduce the original color image. In this case, the four separated toner images of Y, M, C and K are used. A copy process (pitch) is performed one time using the process color of Y. Subsequently, the copy processes will be performed for the remaining process colors M, C and K. A total of four copy cycles are executed. The four images consist of mesh points and are superposed to reproduce a single full color image. Accordingly, when the separated color signals of B, G and R are converted into toner signals of Y, M, C and K, a designer encounters the problems how to adjust the color balance, how to reproduce colors in accordance with the read characteristic of the IIT and the output characteristic of the IOT, how to adjust the balance of density and contrast, and how to adjust the emphasis and blur of the edge, and how to adjust for Moire.

The IPS receives the separated color signals of B, G and R, processes the signals to improve the reproducibility of colors, tone, and definition, converts the toner signals of the developing process colors into on/off signals, and outputs them to the IOT. As shown in FIG. 15, the IPS is made up of an END (equivalent neutral density) conversion module 301, color masking module 302, original size detect module 303, color conversion module 304, UCR (under color removal/black generating module 305, spatial filter 306, TRC (tone production control) module 307, reduction/ enlargement processing module 308, screen generator 309, IOT interface module 310, area image control module 311 including an area generator and a switch matrix, and edit control module including an area command memory 312, color palette video switch circuit 313, and font buffer 314.

In the IPS, 8-bit data (256 gray levels) representing each of the separated color signals B, G and R is applied to the END conversion module 301. The module 301 converts the data into the toner signals of Y, M, C and K. A process color toner signal X is selected and digitized. The digitized signals are transferred, as the on/off data of the process color toner signals, from the IOT interface module 310 to the IOT. Accordingly, in the case of full color (4 colors), the prescan is executed to detect an original size, an edit area, and other necessary information of the original. Then, a first copy cycle is executed using Y as the toner signal X of the process color. Then, a second copy cycle is executed using M for the toner signal X. Subsequently, copy cycles will be executed for the remaining process colors. In total, four copy cycles are repeated.

In the IIT, the color components of R, G and B of the image are read by using the CCD sensor, with the size of one pixel being 16 dots/mm. The IIT outputs the read signals as 24 bits of data (3 colors $\times$ 8 bits; 256 gray levels). B, G and R filters are laid on the upper surface of the CCD sensor with the density of 16 dots/mm and whose total length is 300 mm. The CCD sensor scans 16 lines/mm at a process speed of 190.5 mm/sec. Accordingly, the sensor produces the read data at the rate of about 15 M pixels/sec for each color. The IIT log converts the analog data of B, G, and R pixels to obtain the density data from the reflectivity data, and then digitizes the density data.

Figure 16A:
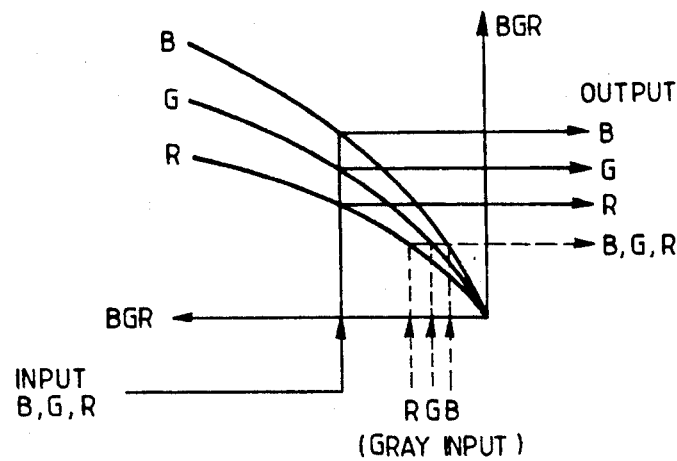
FIGS. 16(a) through 16(q) are explanatory diagrams for explaining the respective module of the IPS.

The respective modules will be described in detail. FIGS. 16(a) through 16(o) are explanatory diagrams for explaining the respective modules of the IPS.

(A) END conversion module

The END conversion module 301 adjusts (converts) the optically read signal of the color original obtained by the IIT into a gray balanced color signal. The amounts of toner of each color are equal when the color is gray. The toner amount of gray is used as a reference toner amount. However, the separated color signals of B, G, and R produced from the IIT when it reads the gray document, are not equal in value, because the spectral characteristics of the light source and the color separation filter are not ideal. These imbalanced color signals are balanced by using converting table (LUT: look up table) as shown in FIG. 16(a). This balancing work by the LUT is the END conversion. When a gray original is read, the LUT converts the B, G, and R color separated signals into signals at the equal gradation in accordance with a level (black →white) of the gray image. The LUT depends on the characteristics of the IIT. 16 LUTs are used. Of those LUTs, all 16 tables are used for film projectors including negative films, and 3 tables are used for copy, photograph, and generation copy.

(B) Color Masking Module

The color masking module 302 converts the B, G, and R color signals into signals indicative of toner amounts of Y, M, and C, respectively, through a matrix operation. This conversion is applied to the signals after they are subjected to gray balance adjustment by the END conversion.

In this instance, the conversion matrix for the color masking is a 3×3 matrix exclusively used for converting B, G, and R into Y, M, and C. A matrix capable of dealing with BG, GR, RB, $B^2$, $G^2$ and $R^2$, in addition to B, G and R may also be used. Any other suitable matrix may be used, if necessary. Two sets of matrices are used, one for an ordinary color adjustment and the other for emphasis signal generation in the monocolor mode.

Thus, when the video signal from the IIT is processed by the IPS, the gray balance adjustment is first conducted. If it follows the color masking process, the gray balance adjustment using the gray original must be made allowing for the characteristics of the color masking. This makes the conversion table more intricate.

(C) Original Size Detection Module

Figure 16B:
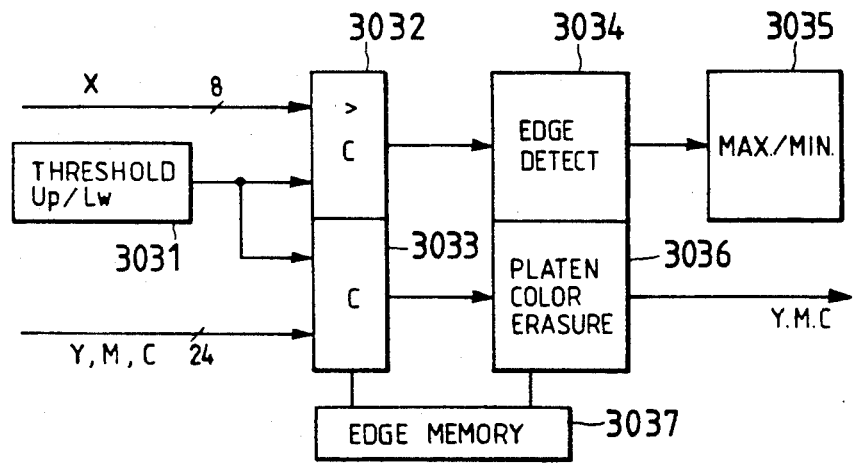

Originals to be copied may comprise not only standard size documents, but also patched up documents and others. To select paper of a proper size corresponding to the size of an original, it is necessary to detect the size of the original. In case that the paper size is larger than the original size, if the peripheral region of the original is masked, the resultant copy will be excellent. For this reason, the original size detection module 303 detects the original size at the time of scanning and suppresses the platen color (edge suppress) at the time of scanning to read the original image. Accordingly, a color, for example black, which is clearly distinguished from the original is used for the platen color. The upper limit value and lower limit value for the platen color discrimination are set in a threshold register 3031, as shown in FIG. 16(b). At the time of a prescan, the signal is converted (gamma (r) conversion) into a signal X representing the data approximate to the reflectivity of the original (by using the spatial filter 306 to be described in detail). The signal X is compared with the upper/lower limit value set in the register 3031, by a comparator 3032. An edge detect circuit 3034 detects the edge of the original, and stores the maximum and minimum values of X and Y in the coordinates into a max./min. sorter 3035.

As shown in FIG. 16(d') and 16(d"), when the original is slanted or its FIG. is not rectangular, the maximum values and the minimum values (s1, x2, y1, y2) at four points on the outline of the FIG. are detected and stored. At the time of scanning to read the original, the comparator 3033 compares the Y, M and C of the original with the upper/lower limit values in the register 3031. A platen color suppress circuit 3036 suppresses the pictorial information outside the edge, viz., the read signal of the platen, to effect the edge suppressing processing.

(D) Color Change Module

Figure 16C:
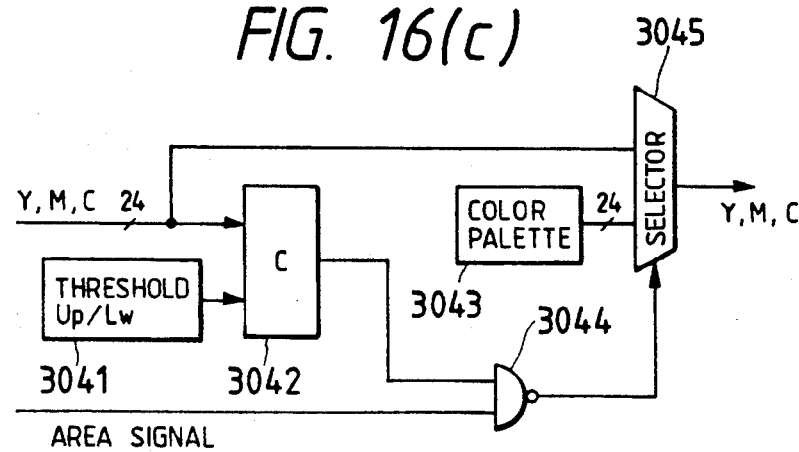

The color change module 304 enables a designated color in a specific area of an original to be erased. As shown in FIG. 16(c), this module is made up of a window comparator 3042, threshold register 3041, and color palette 3043. To effect color change, the upper/lower limit values of Y, M, and C of the colors to be changed are set in the threshold register 3041. The upper/lower limit values of Y, M, and C of the converted colors are set in the color palette 3043. According to an area signal applied from the area image control module, the NAND gate 3044 is controlled. When it is not a color change area, the color signals of Y, M, and C of the original are transferred intact from a selector 3045. When the color change area is reached, and the color signals of Y, M, and C of the original are between the upper limit values and the lower limit values as set in the threshold register 3041, the selector 3045 is switched by the output signal of the window comparator 3042 to send the converted color signals of Y, M, and C that are set in the color palette 3043.

As for the designated color, by directly pointing an original by a digitizer, 25 pixels of B, G, and R in the vicinity of the coordinates as designated at the time of prescan are averaged and the designated color is recognized on the basis of the average. By means of the averaging operation, even in the case of an original with 150 lines, the designated color can be recognized with a precision within 5 of color difference. To the B, G and R density data, the designated coordinates are converted into an address and the density data are read out of the IIT shading correction circuit, with that address. In the address conversion, readjustment corresponding to the registration adjustment is needed, as in the case of the original size detection. In the prescan, the IIT operates in the sample scan mode. The B, G, and R density data read out of the shading RAM are subjected to a shading correction by a software, and averaged. Further, the data are subjected to END correction and color masking, and then are set in the window comparator 3042. The registered colors are selected from 1670 colors, and up to eight colors can be simultaneously registered. The reference color prepared include a total of 14 colors, Y, M, C, G, B, and R, colors between these colors, and K and W.

(E) UCR/Black Generation Module

When the color signals of Y, M, and C have equal quantities, gray is produced. Theoretically, the same color can be obtained by replacing the colors of Y, M, and C of equal quantities with black. In this case, however, the color is impure and hence the reproduced color is not fresh. To cope with this problem, the UCR/black generation module 305 generates a proper amount of K to prevent such a color impurity, and equally reduces the toner colors Y, M, and C in accordance with the amount of the generated K (this process is called an under color removal (UCR)). More specifically, the maximum and the minimum values of the toner colors Y, M, and C are detected. A value of K is generated by a conversion table in accordance with the difference between the maximum value and the minimum value. Further, the toner colors Y, M, and C are UCR processed in accordance with the generated K.

Figure 16E:
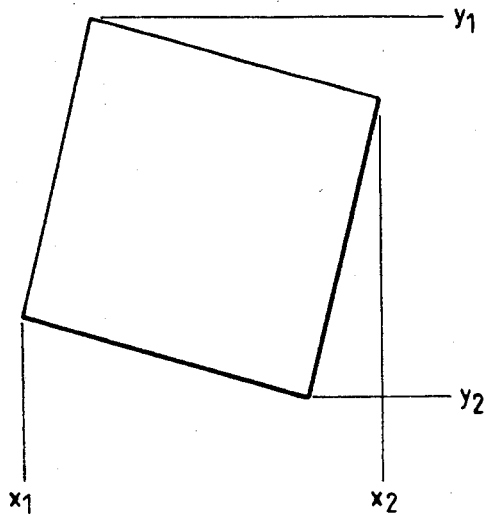
Figure 16E:
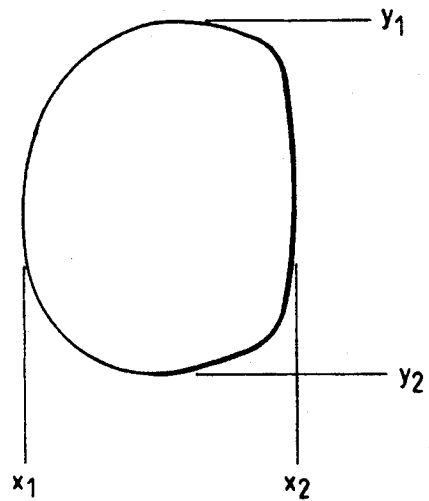
Figure 16E:
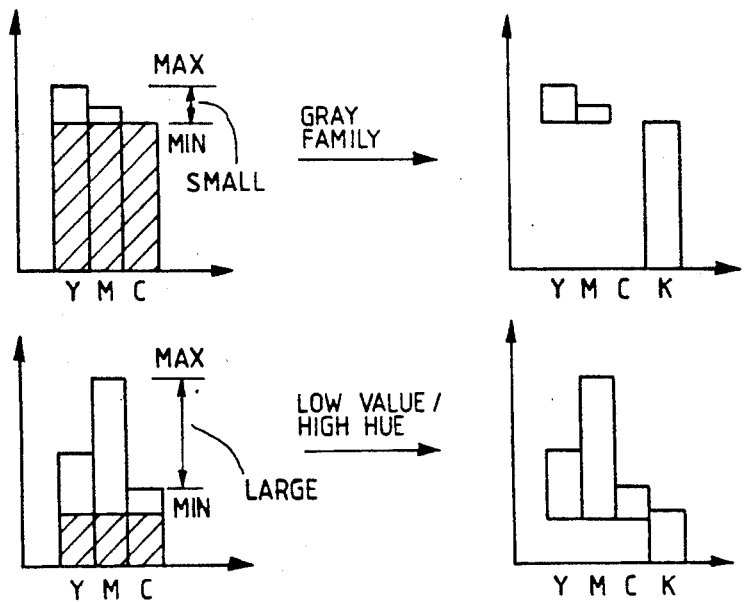

As shown in FIG. 16(e), in the case of a color closer to gray, the difference between the maximum and the minimum values is small. Accordingly, the minimum value or its near value of each color Y, M, and C is removed for generating the color K. When the difference is large, the removal quantities of the colors Y, M, and C are set below the minimum values of them, thereby to reduce the quantity of the generated K. In this way, the mixing of tusche into the pure color and the hue degradation of a low gradation, high hue color can be prevented.

Figure 16F:
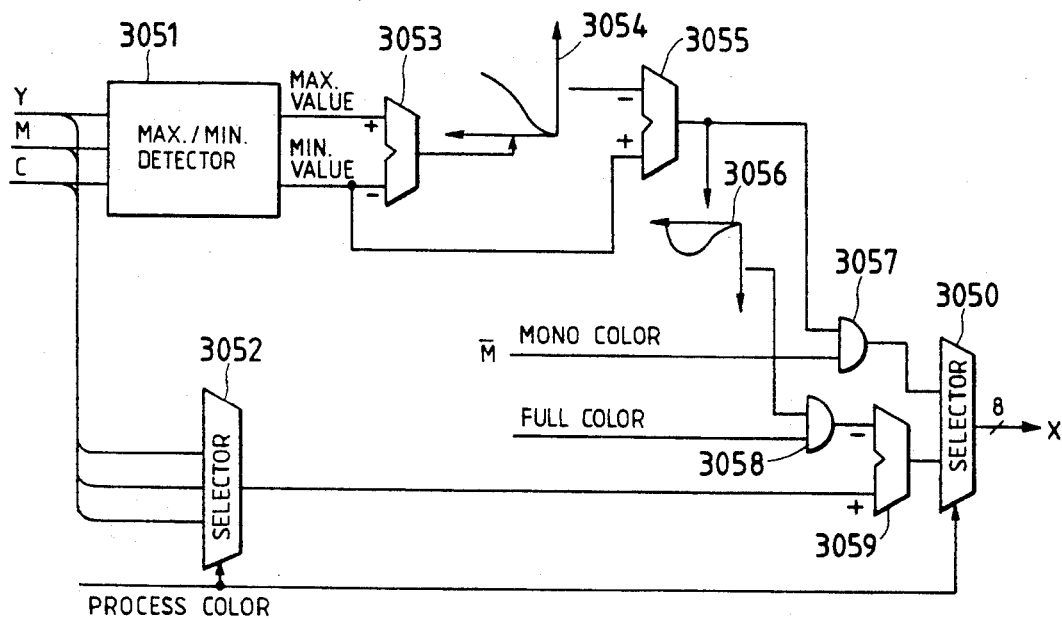

FIG. 16(f) shows a specific circuit arrangement of the UCR/ black generation module, a max./min. value detector 3051 detects the maximum and the minimum values of the process colors Y, M, and C. A calculating circuit 3053 calculates the difference between the maximum and the minimum values of each color.

A conversion table 3054 and another calculating circuit 3055 cooperate to generate the black value K. The conversion table 3054 adjusts the value of K. When the difference between the maximum and the minimum values is small, the output signal of the conversion table is zero. Accordingly, the calculating circuit 3055 produces the minimum value as intact in the form of the value of K. When the difference is large, the output value of the conversion table 3054 is not zero, the calculating circuit 3055 subtracts the difference from the minimum value and produces the result of the subtraction as the value of K.

A conversion table 3056 provides the values to be removed from the colors Y, M, and C in accordance with the K value. In cooperation with the conversion table 3056, an additional calculating circuit 3059 subtracts the values as defined by the K value from the process colors Y, M, and C. The AND gates 3057 and 3058 operate for the signal K, and the signals of Y, M, and C after UCR processing in accordance with the signals in the monocolor mode and the full color mode. The selectors 3052 and 3050 are used for selecting any of the toner signals Y, M, C, and K by the process color signals. A color is thus reproduced by using the mesh points of Y, M, and C. Accordingly, the curves and tables that are empirically formed are used for the removal of Y, M, and C and for determining the generation ratio of K.

(F) Spatial Filter Module

In the color image recording apparatus incorporating the present invention, the IIT reads an image of an original while the original image is being scanned by the CCD. When the data is used as intact, the resultant data will in effect be faded data. The mesh points are used for image reproduction. Accordingly, Moire occurs between the mesh point period of the printed matter and the sampling period of 16 dots/mm. The same phenomenon occurs between the mesh point period generated by the machine and that of the original. The spatial filter module 306 is provided to remove the above fading and the Moire phenomenon. For the Moire removal, a low-pass filter and for edge emphasis, a high-pass filter are used.

Figure 16G:
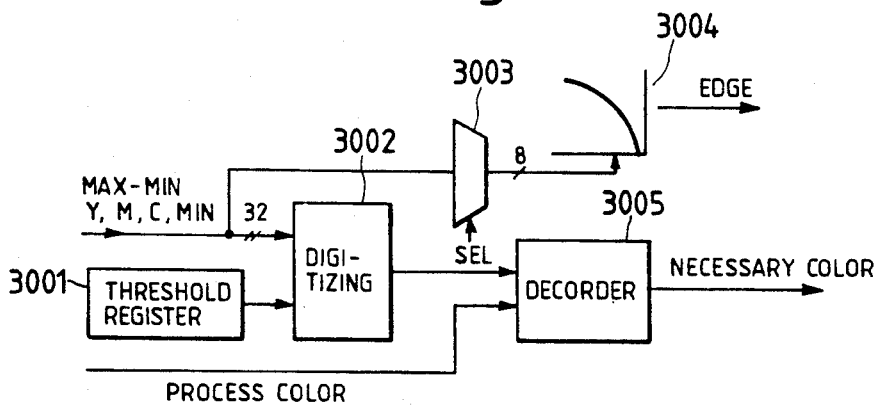

In the spatial filter module 306, as shown in FIG. 16(g), a selector 3003 selects one of the input signals Y, M, C, Min, and Max-Min. A conversion table 3004 converts it into data signals approximately indicative of the reflectivity. Use of this type of data makes it easy to pick up the edge data. In this instance, the selected color signal is Y. A threshold register 3001, 40 bit digitizer 3002, and decoder 3005 separate the color signals Y, M, C, Min, and Max-Min into eight colors, Y, M, C, K, B, G, R, and W (white), for each pixel. A decoder 3005 recognizes the hue in accordance with the digitized data signal, and produces a 1-bit data to indicate whether the color is a necessary process color or not.

Figure 16H:
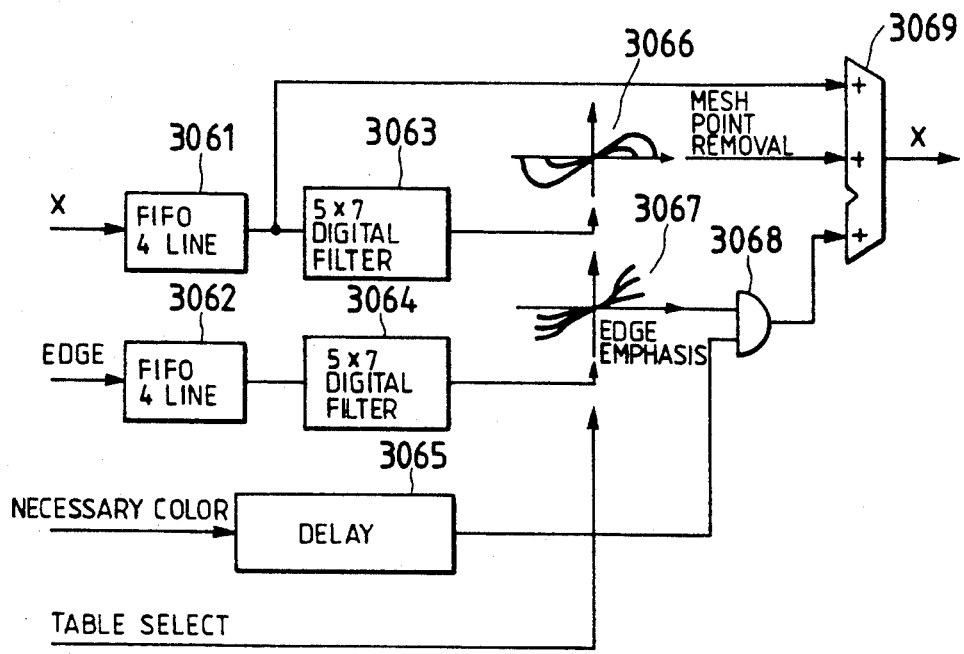

The output signal of the circuit of FIG. 16(g) is applied to the circuit of FIG. 16(h). In this circuit, a FIFO buffer 3061, 5×7 digital filter 3063, and modulation table 3066 cooperate to generate the mesh-point removal data. A FIFO buffer 3062, 5×digital filter 3064, modulation table 3067, and delay circuit 3065 cooperate to generate edge emphasis data by using the output date of the output circuit of FIG. 3(g). The modulation tables 3066 and 3067 are selectively used in accordance with the copy mode used, such as a photograph copy, character only copy, and photo/ character copy.

Figure 16J:
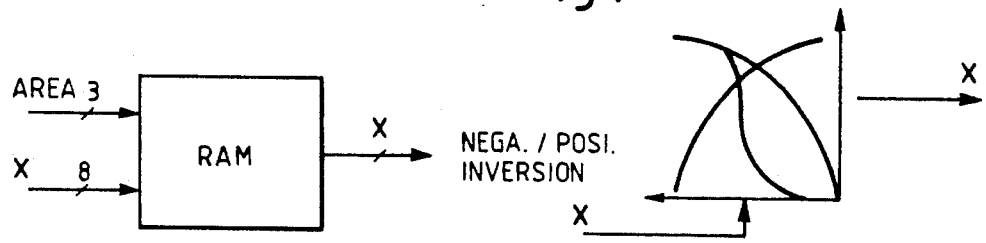
Figure 16K:
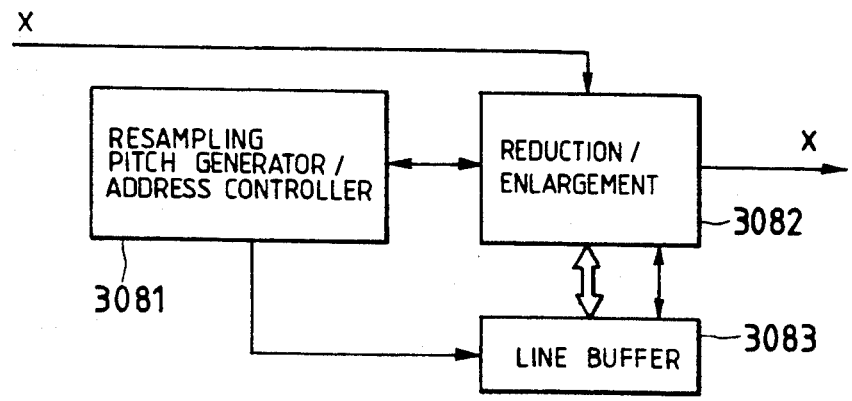
Figure 16I:
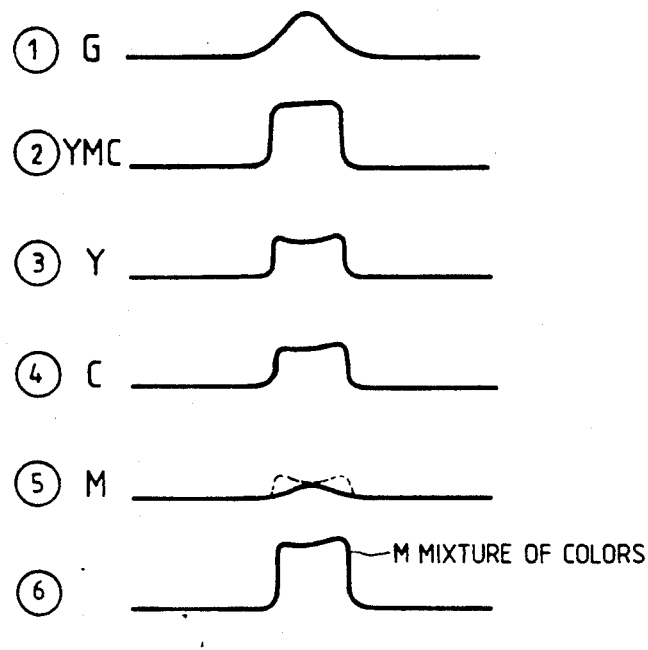
Figure 16L:
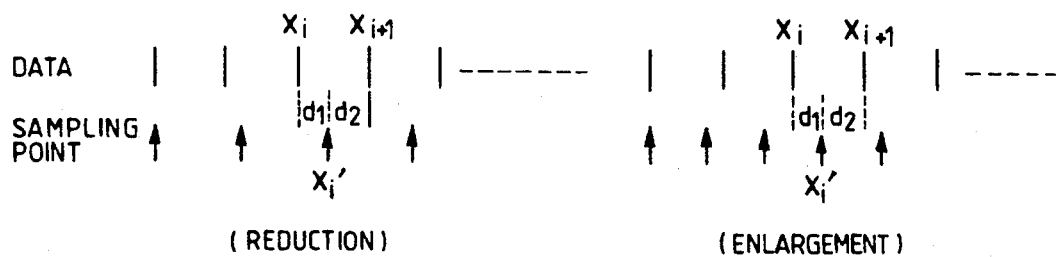

With regard to edge emphasis, when a green character as shown in FIG. 16(i) (1) is reproduced in the form of a character (2), the colors Y and C are emphasized at the edges as indicated by waveforms (3) and (4), but the color M is not emphasized as indicated by the solid line of waveform (5). The switching for this is carried out by the AND gate 3068. In this case, if the waveform (5) of M is emphasized as indicated by a broken line, M is emphasized at the edges as shown in a waveform (6) and accordingly the color purity is lost. To switch the emphasis by the AND gate 306@for each process color, the delay circuit 3065 synchronizes the FIF0 buffer 3062 with the 5×7 digital filter 3064. When a fresh green character is reproduced by using conventional image processing, the magenta M is emphatically mixed into the green character and the color purity is lost. To solve this, the spatial filter module, when recognizing green, outputs the colors Y and C in an ordinary manner, but outputs the magenta M in a manner such that it is not edge emphasized.

(G) TRC Conversion Module

The IOT exercises the copy cycles four times using process colors of Y, M, C, and K in accordance with an on/off signal derived from the IPS (in the case of the full color copy). With this, reproduction of a full color original is realized. Actually, however, to exactly reproduce the colors theoretically obtained through the signal processing, delicate and careful adjustment is required taking the characteristics of the IOT into consideration. The TRC conversion module 309 is used for improving the color reproduction. An address conversion table containing various combinations of Y, M, and C, which is accessed with 8-bit image data, is stored in the RAM, as shown in FIG. 16(j). With use of such a table, the following various functions, such as density adjustment, contrast adjustment, negative/positive inversion, color balance adjustment, character mode, and transparent composition, may be exercised in accordance with an area signal. The bits 0 to 3 of the area signal are assigned to the upper three bits of the RAM address, respectively. In an out-of-area mode, the above functions may be appropriately combined. In this instance, the RAM has a memory capacity of 2 K bytes (256 bytes×8 planes), and eight conversion tables. During the IIT carriage return, a maximum of 8 conversion tables are stored every cycle of Y, M, and C. These tables are selectively used in accordance according to the area designation and copy mode used. If the memory capacity of the RAM is increased, there is no need for storing the tables every cycle.

(H) Reduction/Enlargement Module

The reduction/enlargement module 308, as shown in FIG. 16(k), exercises the reduction/enlargement processing by a reduction/ enlargement processor 3082 during a period that data X is temporarily stored in a line buffer 3083 and then is transferred therefrom. A resampling generator/address controller 3081 generates a sampling pitch signal and a read/write address for the line buffer 3083. The line buffer 3083 serves as a ping-pong buffer of two lines in which line data is read out of one of one of the lines, while at the same time the next line data is written into the other line. The reduction/enlargement processing in the main scan direction is digitally processed by the reduction/ enlargement module 308. For the reduction/enlargement in the vertical scan direction, the scan speed of the IIT is appropriately varied. The scan speed is varied in the range from 2 times to ¼ time, to vary the magnification from 50% to 400%. In the digital processing, when the data is transferred to and from the line buffer 3083, reduction is based on a thin-out interpolation, while enlargement is based on an additional interpolation. When the data lies between the adjacent sampling points, interpolation data is obtained by weighting the in-between data in accordance with the distances of that data to the data located on both sides, as shown in FIG. 16(1). If the data is Xi', for example, the following calculation $$(Xi \times d2) + (Xi+1 \times d1)$$

where $d1 + d2 = 1$, and $d1$ and $d2$ are distances from a sampling point to the data $Xi$ and $Xi+1$ on both sides of the data $Xi'$.

In reduction processing, data is loaded into the line buffer 3083 while interpolating the data. At the same time, the reduced data in the previous line is read out of the buffer, and sent to the succeeding stage. In enlargement processing, the data is loaded into and temporarily stored in the line buffer, while the data is interpolated for enlargement while reading the previous line data out of the line buffer. When the interpolation for enlargement is conducted at the time of writing, a clock frequency must be increased in accordance with magnification. Such an enlargement process, however, allows the same clock to be used for both the read and write operations. Further, the shift image processing in the main scan direction is possible by reading data at a midpoint between one read timing and the next read timing or by delaying the read timing. Repetitive processing is possible by repeatedly reading data. Mirror image processing is also possible when data is read out in the reverse direction.

(I) Screen Generator

A screen generator 309 converts a gradation toner signal of each process color into an on/off or binary toner signal. In the screen generator, the digitizing processing and the error diffusion processing are conducted by comparing a threshold matrix with the gradation data. The IOT receives the binary toner signal, and turns on and off a laser beam to reproduce a halftone image. In this case, the laser beam is elliptically shaped in cross section with its geometry of about 60μm wide. These FIGS. are selected so as to satisfy the recording density of 16 dots/mm.

The manner for expressing gradation data will first be described. The description to follow is directed to the process for forming halftone, cells each of 4×4, for example, as shown in FIGS. 16(H') and 16(H') To form the cells, the screen generator sets up a threshold matrix "mm" corresponding to such a halftone cell. Then, it compares the matrix with the gradation data. If the value of data is "5", the screen generator generates signals that are turned on in the squares of the matrix "m" whose FIGS. are less than "5".

The 4×4 halftone cell of 616 dots/mm is generally called a mesh point of 100 psi and 16 gradations. If an image is depicted by such mesh points, the image reproduction is poor. In the present invention, to increase the gradations, the 16 dots/mm pixel is further divided into four in the vertical direction (main scan direction). Accordingly, the laser beam is turned on and off at the 4-times the frequency as shown in FIG. 16(o'), 16(o''), and 16(o'') gradation attained is four times that of the conventional gradation method. To this end, a threshold matrix "m," as shown in FIG. 16(o'), 16(o''), and 16(o'') is set up in the present invention. Further, if a submatrix method is used, the number of lines will effectively be increased.

Figure 16M:
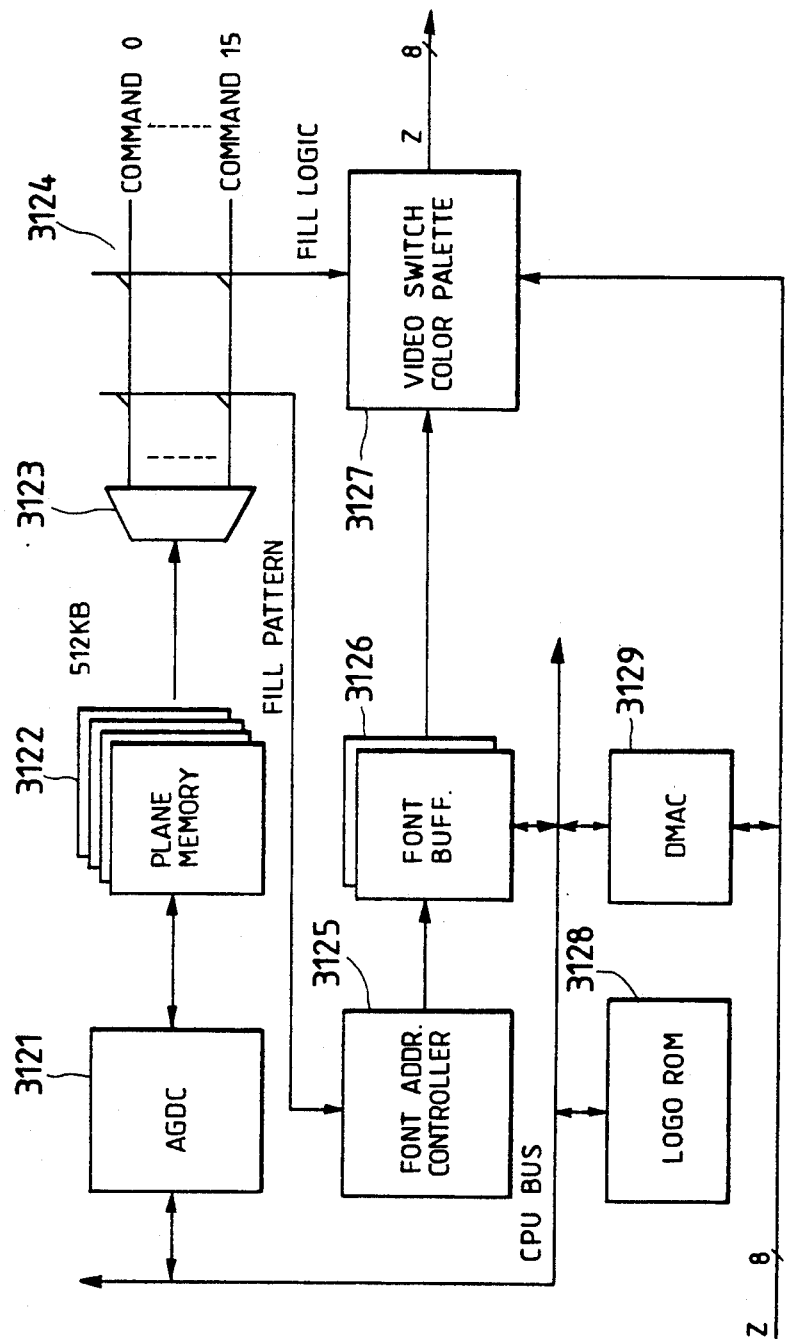
Figure 16P:
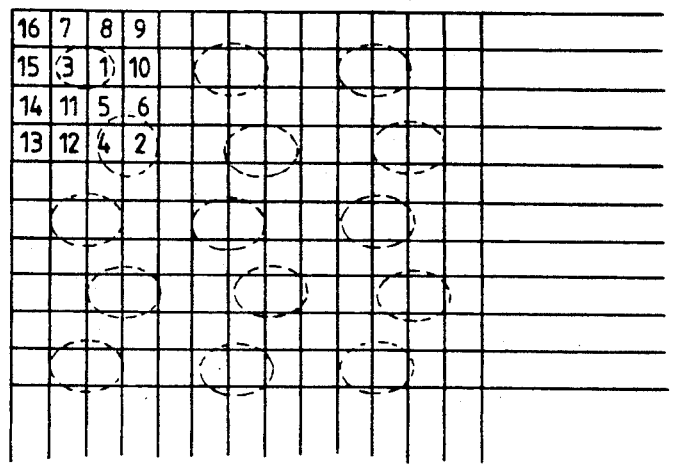

The above instance uses the threshold matrices "m" of the type in which the center portion of each halftone cell is used as a sole growth nucleus. In the submatrix method, a pixel consists of a plurality of unit matrices. Each matrix has two growth nuclei or more, as shown in FIG. 16(p). If such a screen pattern design method is used, the number of lines and the gradation may be changed in accordance with bright or dark portions, in such a way that 141 psi and 64 gradations are used for bright portions, and 200 psi and 128 gradations, for dark portions. Such a pattern may be designed while visually judging smoothness in gradation, definition, graininess, and the like.

Figure 16Q:
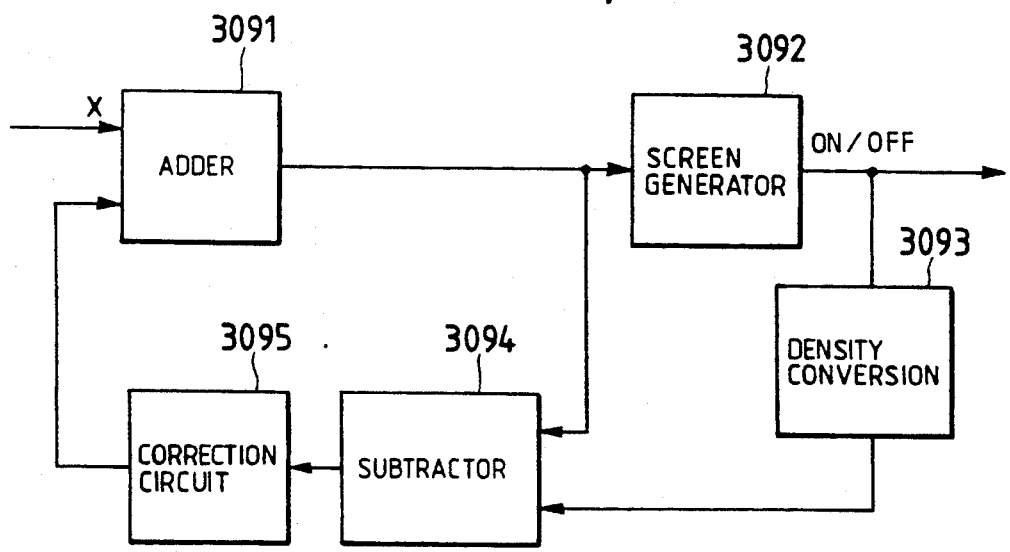

When the halftone image is reproduced by using the above dot matrix method, the gradation or gray level and the resolution contradictively coexist. For example, if the gray level is increased, the resolution becomes poor. On the other hand, if the resolution is increased, the gray level is decreased. If small threshold data matrices are used, the actually outputted image suffers from quantization error. The error diffusion processing is to improve the gradation reproducibility in such a manner that as shown in FIG. 16(q), the quantization errors of the on/off or binary signal generated by a screen generator 3092 and the input graduation signal are detected by a density converting circuit 3095 and adder 3091, and are fed back by using a correction circuit 3093 and an adder 3091. For example, the corresponding position of the previous line and the pixels on both sides of it are convoluted through a digital filter.

The screen generator changes over the threshold error and a feedback coefficient for the error diffusion processing every original or area in accordance with the type of image, such as halftone images and character images. In this way, the reproduction of images of high graduation and high definition is improved.

(J) Area Image Control Module

In the area image control module 311, seven rectangular areas can be set in a priority order in an area generator. Control data relating to the respective areas are set in a switch matrix. The control data includes color change data and color mode data indicative of monocolor or full color, modulation select data of photograph, characters, and the like, select data of TRC, select data of the screen generator, and the like. The control data is used for controlling the color masking module 302, color conversion module 304, UCR module 305, spatial filter 306, and TRC module 307. The switch matrix may be set by software.

(K) Edit Control Module

The edit control module executes outline-drawing processing in which an original bearing a circular figure, such as a circular graph (not a rectangular figure) is read, and a specified area whose configuration is indefinite is painted with a specified color. As shown in FIG. 16(m), a CPU bus is clustered with an AGDC (advanced graphic digital controller) 3121, font buffer 3126, logo ROM 3128, and DMAC DMA controller) 3129. The CPU writes encoded 4-bit area commands into a plane memory 3122 through the AGDC 3121, and font is loaded into the font buffer 3126. The plane memory 3122 consists of four memory planes. Each point on an original can be set by 4 bits (one bit of each of planes 0 to 3) in such a manner that for "0000", a command 0 is used to output an original. A decoder 3123 decodes the 4-bit data to commands 0 to 15. A switch matrix 3124 converts the commands 0 to 15 into commands to make jobs of 11 pattern, fill logic, and logo type. A font address controller 3125 generates an address of a font buffer 3126 in accordance with a pattern such as mesh point shade and hatching shade, by using a 2-bit fill pattern signal.

The switch circuit 3127 selects one of document data X, font buffer 3126 and color palette in accordance with a fill logic signal of the switch matrix 3124 and the contents of the original data X. The fill logic is used to fill only background (of original) with a color mesh, to change the color in a specific portion of the image to another color, and to mask or trim a specific portion of the image, and to fill with a color.

As seen from the foregoing description, in the IPS, the read signals from the IIT are subjected to END conversion and the color masking process. The read signals are further subjected to edge suppress and the color change processing, and the under color removal process. A tusche color is generated. Then, the read signals are converted into the signals for the process colors. In the case of the processing, steps such as spatial filter, color modulation, TRC, and reduction/enlargement, it is better to use the process colors data rather than to use the full color data, because the amount of process data is small, and hence the number of conversion tables may be reduced to ⅓. Accordingly, more varieties of the conversion tables may be used, to improve the reproducibility of colors, gradation, and definition.

(III-2) IPS

FIGS. 17(*a*) through 17(*d*) show a hardware configuration of the IPS. In this instance, the circuitry of the IPS may be divided into two circuit boards IPS-A and IPS-B. The circuit board IPS-A contains circuitry for exercising the basic functions of the color image recording apparatus, such as reproductions of colors, gradation, and definition. The circuit board ISP-B contains circuitry for exercising applications and professional works, such as edit works. An arrangement of circuitry contained in the first circuit board IPS-A is as shown in FIGS. 17(*a*) to 17(*c*). A circuit arrangement contained in the second circuit board IPS-B is shown in FIG. 17(*d*). During the course of using the copier as the color image recording apparatus of the present invention, there will inevitably occur user demands for additional and new applications and professional work. The copier may flexibly cope with such demands by merely modifying and altering only the circuitry of the second circuit board IPS-B, because the basic functions of the copier are secured by the circuitry of the first circuit board.

The IPS boards are coupled with CPU buses including an address bus ADRSBUS, data bus DATABUS and control bus CTRLBUS. The boards are also coupled with video data B, G, and R from the IIT, video-clock IIT VCLK as an async signal, line sync signal (the main scan direction and the horizontal sync) IIT LS, and page sync (vertical scan direction, vertical sync) IIT PS.

The video data is pipeline processed in the stage after the ENC converting unit. Accordingly, the video data is delayed by a delay amounting to the number of clocks required for the respective processing stages in the pipeline processing. A line sync generator/fail check circuit 328 is provided for generating and distributing horizontal sync signals to meet such a situation of delay, and for the fail check of the videoclock and the line sync signal. Therefore, the line sync signal generator/-fail check circuit 328 is coupled with the video clock IIT VCLK and the line sync signal IIT LS. To change the settings of the circuit 328, it is coupled with the CPU buses (ADRBUS, DATABUS and CTRLBUS), and a chip select signal CS.

The video data B, G, and R from the IIT are inputted to the ROM 321 in the END converting unit. The END conversion table may be loaded into a RAM, for example, under control of the CPU. Actually, however, when use of the copier progresses, there seldom occurs a situation that the END table must be altered when the image data is being processed. For this reason, two ROMs of 2K bytes are used for each of the END conversion tables of B, G, and R. That is, this instance employs a LUT (look-up table) system using the ROMs. 16 conversion tables are provided and selectively used by a 4-bit select signal ENDSel. The END converted data signal outputted from ROM 321 is coupled with a color masking unit made up of three calculation LSI322 each having two planes each of 3×2 matrix for each color. The calculation LSI 322 is coupled with the CPU buses.

The coefficients of the matrices may be set in the calculation LSI 322 from the CPU. The LSI 322 is coupled with a set-up signal SU and a chip select signal CS. These signals are used for connecting the calculation LSI 322 having processed the image signals to the CPU buses so as to allow the CPU to reprogram the settings in the LSI 322. A 1-bit select signal MONO is coupled with the calculation LSI 322 for selection of the matrices. The LSI 322 further receives a power down signal PD. When no scan is made in the IIT, viz., no image processing is performed, the internal video clock is stopped by the power down signal PD.

The Y, M, and C signals that have been converted from the color image signals B, G, and R by the LSI 322, are applied to a color change LSI 353 in the second circuit board IPS-B shown in FIG. 17(*d*). Here, the colors of these signals are changed, and inputted to a DOD LSI 323. The color change LSI 353 contains four color change circuits each consisting of a threshold register for setting the not-changed colors, a color palette circuit for setting changed colors, and a comparator. The DOD LSI 323 contains an original edge detector, black edge suppressor, and the like.

The black edge suppressed data signal outputted from the DOD LSI 323 is applied to an UCR LSI 324. This LSI contains an UCR circuit, black generating circuit, and necessary color generators. The LSI 324 produces a process color X corresponding to the toner color, necessary colors Hue, and edge signal Edge. Accordingly, this LSI also receives a process color designating signal COLR and color mode signals (4COLR, MONO).

The line memory 325 consists of two types of FIFO buffers. The first type of FIFO buffer is used for storing data of 4 lines in order to transfer the signals of the process color X, necessary colors Hue, and edge Edge to a 5×7 digital filter 326. The second FIFO buffer is for adjusting for the delays caused by the first FIFO buffer. The process color X and edge (Edge) signals of 4 lines are stored, and at a total of five lines of those data signals are transferred to the digital filter 326. The data signal of the necessary color Hue is delayed by the FIFO, to synchronize it with the output data signal of the digital filter 326, and then is transferred to a MIS LSI 327.

The digital filter 326 consists of two 5×7 filters (low-pass filter LP and high-pass filter HP) each consisting of three 2×7 filter LSIs. One of the 5×7 filters is used for processing the process color, X, and the other, for processing the edge Edge data signal. The MIS LSI 327 applies the mesh-point removal and the edge emphasis to these output data signals by using the conversion tables, and the processed data signals are mixed into the process color X. The LSI 327 receives an edge EDGE signal and a sharp Sharp signal for switching the conversion tables one another.

The TRC 342 consists of a RAM of 2K bytes containing light conversion tables. The conversion table may be reprogrammed during the return period of the carriage before each scan. A 3-bit select signal TRSel is used for selecting any of the conversion tables. The data processed by the TRC 342 is transferred to a reduction-/enlargement LSI 345 by a transceiver. In the reduction/enlargement unit, a couple of RAMs 344 of 8K bytes constitute a ping-pong buffer (line buffer). The LSI 343 generates resampling pitches, and the addresses for the line buffer.

Figure 17A:
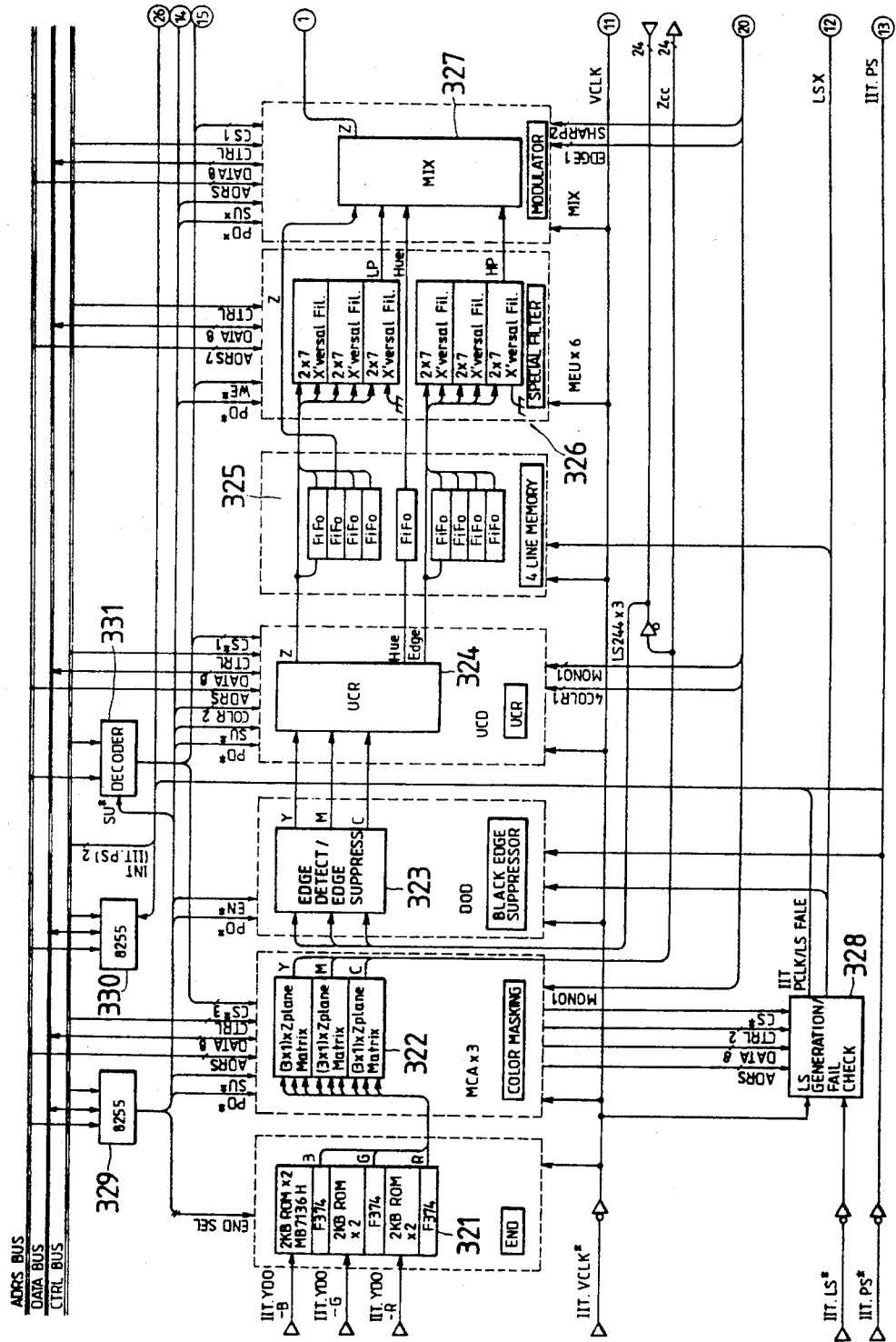
FIGS. 17(a) through 17(d) are block diagrams of a hardware configuration of the IPS.
Figure 17B:
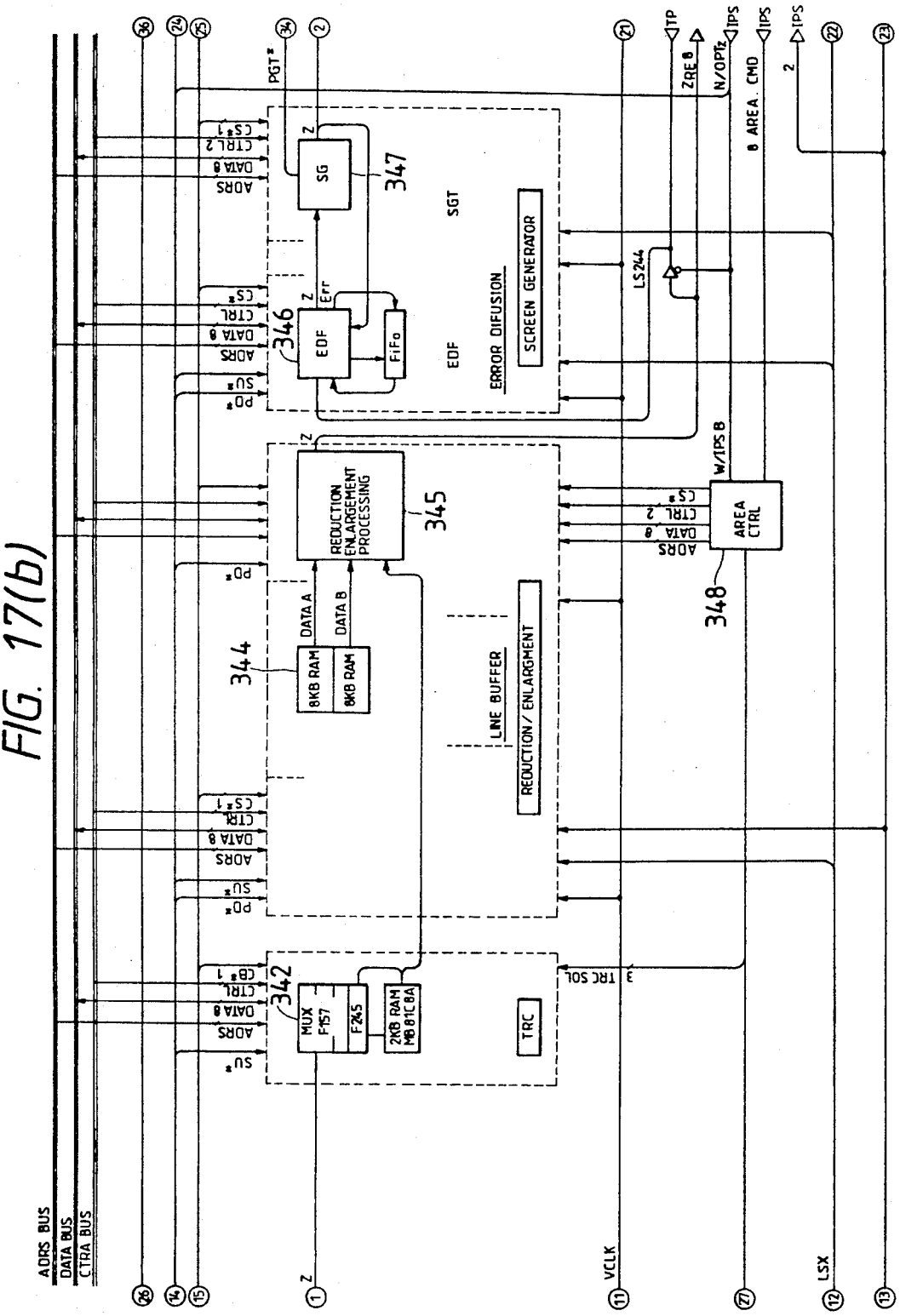
Figure 17C:
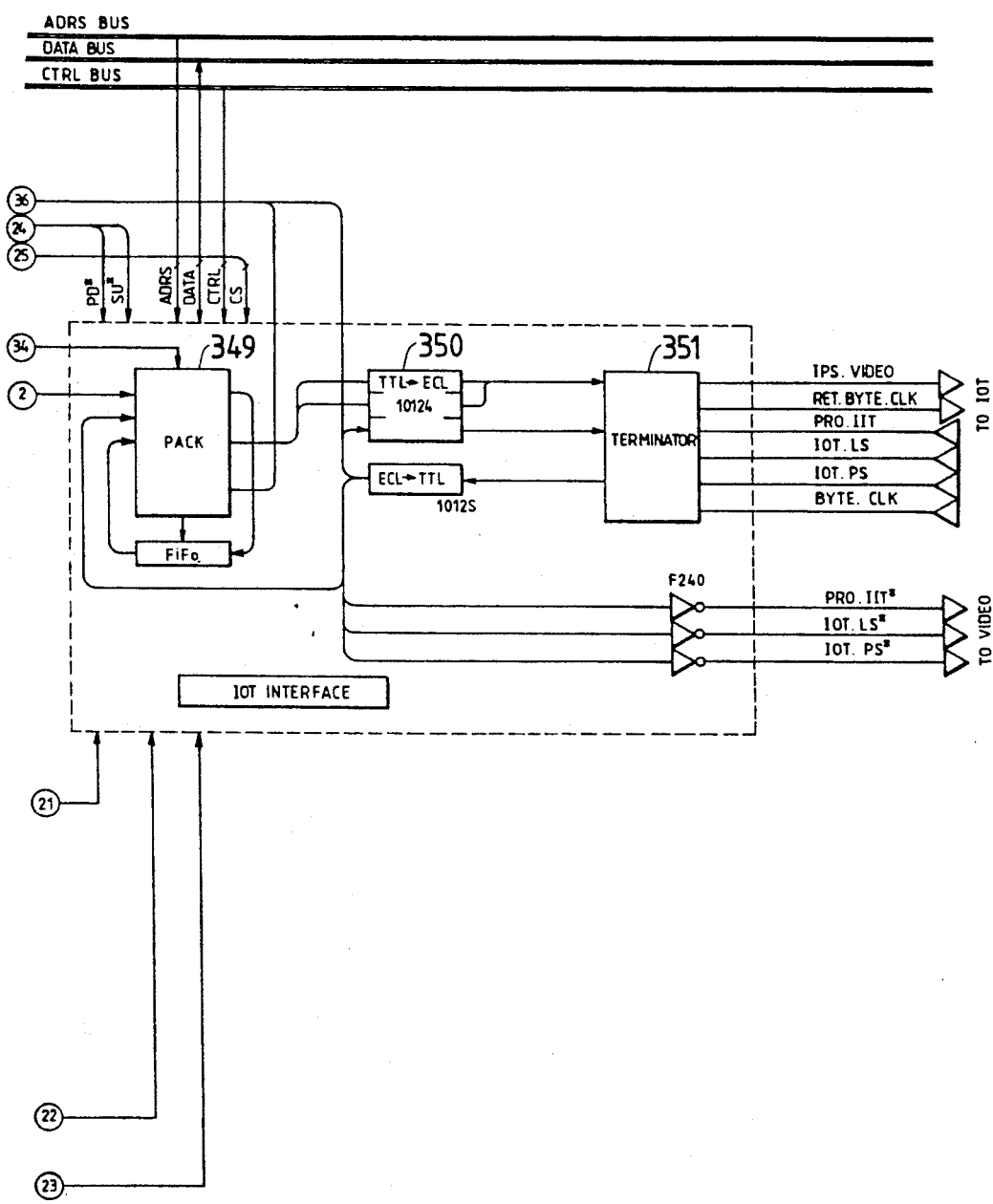
Figure 17D:
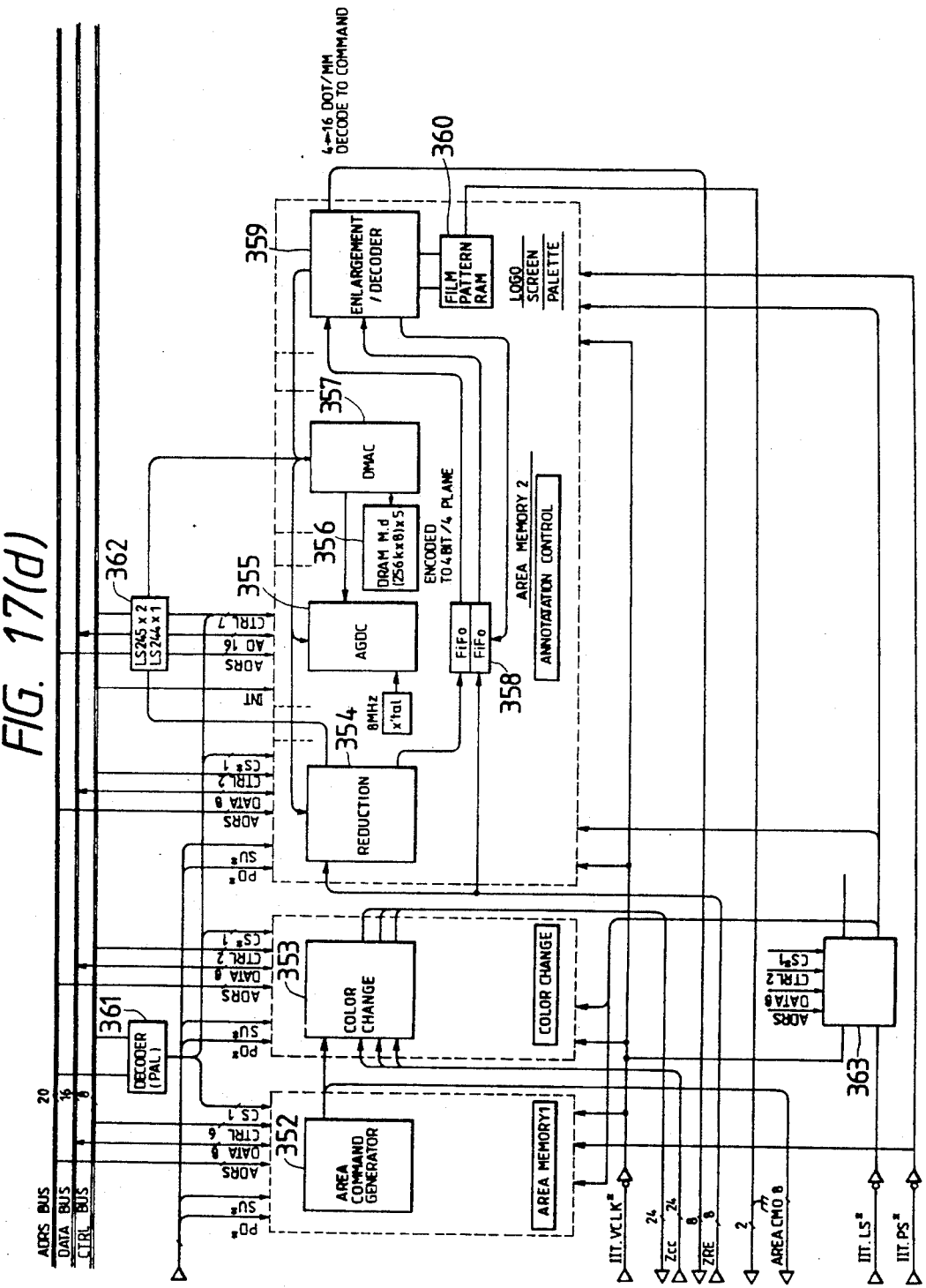

The output data of the reduction/enlargement unit returns by way of an area memory portion in the second circuit board of FIG. 17(d). An EDF LSI 346 contains a FIFO buffer retaining the data of the previous line, and exercises an error diffusion processing by using the previous line data. A signal X after error diffusion processing is outputted to an IOT interface by way of an SG LSI 347 in a screen generator unit.

In the IOT interface, the signals outputted from the SG LSI 347, which received the signals in the form of 1-bit on/off signals are packed into an 8-bit data signal, and are sent in parallel to the IOT.

In the second circuit board of FIG. 17, the data signal actually flowing in the board are for the 16 dots/mm record density. Because of this, a reduction LSI 354 reduces the data into ¼, digitizes the data, and finally stores the data into an area memory. An enlargement decode LSI 359 contains a fill pattern RAM 360. When reading the area data out of the area memory to generate a command, the LSI 359 expands the data into the 16 dots/mm data. By using the expanded data, it generates a log address, color palette, and filter pattern. A DRAM 356, consisting of four planes, stores coded area data of 4 bits. An AGDC 355 is a controller exclusively used for controlling the area commands.

It should be understood that the present invention is not limited to the above-mentioned embodiments, but may be variously be changed and modified within the spirit of the invention. While the invention has been described using the colory copying machine, it is evident that the invention is applicable for a normal copying machine if it is arranged so as to ready an original and reproduces the read image in the dither method.

In the above description, the parameters of the filters are changed by an area designating signal. The following alternative is allowed. It is possible to discriminate between the character area and the halftone area by using the edge detect signal from the filter. Accordingly, a discrimination circuit is provided following the filter producing the edge detect signal. The discrimination circuit determines whether or not the image area is the halftone area or the character area. The parameters may be changed for each block according to the signal output from the discrimination circuit. The background density in the character area is lower than that in the halftone area. Accordingly, when determining the image area on the basis of the edge detect signal, an average value of the edge quantities in picture elements whose density is in excess of a preset threshold value, a ratio of the number of picture elements whose edge quantity is above a preset threshold value to the number picture elements when density is above a preset threshold value, and the like may be used as index values.

As seen from the foregoing description, the parameters for the smoothing process and the edge emphasis process, which are for removing noise and mesh-dot components, are changed according to the image modes, sharpness, and magnification, so modulation or conversion tables are combined, and the parameters are selectively changed for the combination. Accordingly, the picture quality can effectively be controlled. If the filter and tables are constructed with LUTs, the parameters can be changed by merely changing the as to prevent blur, Moire, and the like. Accordingly, many types of the originals can be reproduced in a high image quality. Further, the linear filter and the nonlinear modulation or conversion table are combined, and the parameters are selectively changed for the combination. Accordingly, the picture quality can effectively be controlled. If the filter and tables are constructed with LUTs, the parameters can be changed by merely changing the contents in the RUts.

What is claimed is:

1. An image quality control system for an image processing system for producing an image of high quality by removing noise and mesh-dot components from image input signals representing a scanned original image, the image quality control system comprising:

a low-pass smoothing filter adapted for removing from image input signals representing a halftone image substantially all of any mesh-dot component, for smoothing the image input signals representing the halftone image, and for producing smoothed output signals representing said smoothed image input signals;

a smoothing modulation table for modulating said smoothed output signals of said smoothing filter to produce modulated smoothed output signals;

a bandpass edge detect filter for detecting edge component signals of the image input signals, said edge component signals comprising a high frequency component of the image input signals, said edge detect filter producing edge output signals;

an edge emphasis modulation table for modulating said edge output signals to produce modulated edge output signals; and means for selecting parameters of said bandpass edge detect filter, said low-pass smoothing filter, said smoothing modulation table, and said edge emphasis modulation table for every image signal such that said modulated edge output signals and said modulated smoothed output signals correspond to the image input signals with the noise and mesh-dot components thereof substantially removed.

2. The image quality control system according to claim 1, wherein said selecting means selects the parameters of said smoothing filter and said edge detect filter such that a cutoff point is set at a point within a range between about 133 lines and about 200 lines.

3. The image quality control system according to claim 1, wherein the image input signal may represent character images, photograph images, print images, and an integrated original images wherein character, photograph, and print images coexist, and wherein said selecting means selects parameters of said bandpass edge detect filter, said low-pass smoothing filter, said smoothing modulation table, and said edge emphasis modulation table according to the type of image represented by said image input signals.

4. The image quality control system according to claim 3, wherein said selecting means selects parameters of said bandpass edge detect filter, said low-pass smoothing filter, said smoothing modulation table, and said edge emphasis modulation table parameters according to area signals identifying the location of the character images, photograph images, print images, and integrated original images within the original images.

5. The image quality control system according to claim 3, wherein in response to image input signals corresponding to said integrated original images said selecting means selects a modulation curve having a maximum value, sets said parameters of said edge emphasis modulation table to have a cut-off point of approximately 0.24 of the maximum value, a converted value of the maximum value set at approximately 0.71 of the maximum value, and a point where asymptotic lines of the modulation curve intersect equal to or near a point defined by a value to be converted that is 0.47 of said maximum value and said converted value is 0.63 of the maximum value.

6. The image quality control system according to claim 3, wherein said selecting means selects said parameters of said edge emphasis modulation table to have values in the minus side in the range of ¼ to ½ of values in the plus side.

7. The image quality control system according to claim 2, wherein in response to the input image signal representing character images said selecting means selects parameters of said edge emphasis modulation table to produce modulated edge detect signals to intensify the emphasis of edge component signals to a degree greater than when the image input signals represent integrated original images.

8. The image quality control system according to claim 3, wherein in response to the input image signal representing photograph images said selecting means selects parameters of said edge emphasis modulation table to produce modulated edge detect signals to intensify the emphasis of edge component signals to a degree between the emphasis when the image input signals represent integrated original images and when the image input signals represent character images.

9. The image quality control system according to claim 3, wherein in response to the input image signal representing photograph images said selecting means selects parameters of the edge emphasis modulation table to produce modulated edge detect signals to intensify the emphasis of edge component signals to a degree less than when the image input signals represent integrated original images.

10. The image quality control system according to claim 3, wherein said selecting means selects parameters of the smoothing modulation table to reduce the smoothing process when the input image signals correspond to character images, to smooth only low frequency input image signals when the input image signals represent photograph images, and to output as the modulated smoothed output signals the smoothed output signals without modulation when the input image signals represent print images and integrated original images.

11. The image quality control system according to claim 3, wherein said setting means selects a lower cut off point for said low-pass smoothing filter when the image input signals represent photograph images and integrated original images, and sets said parameters of said edge emphasis modulation table to first values to decrease edge emphasis and image sharpness and to second values greater than the first values to increase edge emphasis and sharpness.

12. The image quality control system according to claim 3, wherein in response to the image input signals representing character images, the setting means selects values for said edge emphasis modulation table in accordance with the desired level o sharpness.

13. The image quality control system according to claim 3, wherein in response to the input image signals representing print images, said setting means selects a decrementally shifted cutoff point for said smoothing filter and sets said parameters of said edge emphasis modulation table to make the image more intensive.

14. The image quality control system according to claim 1, wherein in response to the selection of an image reduction/ enlargement processing mode, said setting means selects parameters for said smoothing filter and said edge emphasis modulation table according to selected level of image reduction or magnification.

15. The image quality control system according to claim 14, wherein said setting means selects said parameters for said lowpass smoothing filter and said edge emphasis modulation table after reduction/enlargement processing.

16. The image quality control system according to claim 14, wherein said setting means selects said parameters for said lowpass smoothing filter and said edge emphasis modulation table before reduction/enlargement processing.

17. The image quality control system according to claim 14, wherein said setting means selects said parameters for said lowpass smoothing filter and said edge emphasis modulation table between two first and second of reduction/enlargement processing steps.

18. The image quality control system according to claim 14, wherein said setting means selects said parameters for said low-pass smoothing filter and said edge emphasis modulation table before and after reduction/enlargement processing.

19. The image quality control system according to claim 14, wherein in response to selection of an image reduction mode, said setting means selects increased values for said parameters for said edge emphasis modulation table.

20. The image quality control system according to claim 14, wherein in response to the selection of an image enlargement mode, said setting means selects said parameters for said edge emphasis modulation table, which are decreased in response to a characteristic curve and incrementally shifts a cut-off point of said low-pass smoothing filter.

21. The image quality control system according to claim 14, wherein said setting means selects stepwise changes for said parameters.

22. The image quality control system according to claim 21, wherein said stepwise changes change substantially at a mid point between successive regular levels of reduction and magnification.

23. The image quality control system according to any of claims 1 to 22, wherein said setting means selects said parameters according to the type of image represented by the input image signals, the desired image sharpness, and the selected level of reduction and magnification.

* * * * *

UNITED STATES PATENT AND TRADEMARK OFFICE
CERTIFICATE OF CORRECTION

PATENT NO. : 5,166,810

DATED : November 24, 1992

INVENTOR(S) : Yoshiyuki Sorimachi et al

Page 1 of 2

It is certified that error appears in the above-indentified patent and that said Letters Patent is hereby corrected as shown below:

Column 24,

Claim 3, column 24, line 68, delete "an".

Column 25,

Claim 11, column 25, line 67, after "cut" insert hyphen.

Claim 11, column 25, Penultimate line after "filter" insert --and--.

Column 26,

Claim 12, column 26, line 11 change "o" to --of--.

Claim 13, column 26, line 15 change "cut off" to --cut-off--.

Claim 14, column 26, line 20 change "reduction/ enlargement" to --reduction/enlargement--.

Claim 15, column 26, line 26 change "lowpass" to --low-pass--.

UNITED STATES PATENT AND TRADEMARK OFFICE
CERTIFICATE OF CORRECTION

PATENT NO. : 5,166,810
DATED : November 24, 1992
INVENTOR(S) : Yoshiyuki Sormachi et al It is certified that error appears in the above-indentified patent and that said Letters Patent is hereby corrected as shown below:

Column 26,

Claim 16, column 26, line 31 change "lowpass" to --low-pass--.
Claim 17, column 26, line 36 change "lowpass" to --low-pass--.
Claim 18, column 26, line 42 change "reduction-/enlargement" to --reduction/enlargment--
Claim 18, column 26, line 43 change "reduction-/enlargement" to --reduction/enlargement--
Claim 22, column 26, line 60 change "mid point" to --midpoint--.

Signed and Sealed this

Eighth Day of February, 1994

Attest:

Attesting Officer

BRUCE LEHMAN

Commissioner of Patents and Trademarks